United States Patent
Neerincx et al.

(10) Patent No.: US 11,110,635 B2
(45) Date of Patent: Sep. 7, 2021

(54) METHOD OF INJECTION MOLDING USING RIBS AND APPARATUS THEREFOR

(71) Applicant: SABIC Global Technologies B.V., Bergen op Zoom (NL)

(72) Inventors: Peter Neerincx, Oisterwijk (NL); Ruud Heerkens, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 506 days.

(21) Appl. No.: 15/762,384
(22) PCT Filed: Sep. 23, 2016
(86) PCT No.: PCT/IB2016/055708
§ 371 (c)(1),
(2) Date: Mar. 22, 2018
(87) PCT Pub. No.: WO2017/051375
PCT Pub. Date: Mar. 30, 2017

(65) Prior Publication Data
US 2018/0272583 A1   Sep. 27, 2018

Related U.S. Application Data
(60) Provisional application No. 62/232,510, filed on Sep. 25, 2015.

(51) Int. Cl.
*B29C 45/16*  (2006.01)
*B29C 45/17*  (2006.01)
(Continued)

(52) U.S. Cl.
CPC .......... *B29C 45/1679* (2013.01); *B29C 44/06* (2013.01); *B29C 44/086* (2013.01);
(Continued)

(58) Field of Classification Search
CPC ............................ B29C 45/16; B29C 45/1679
See application file for complete search history.

(56) References Cited

U.S. PATENT DOCUMENTS 5,403,647 A * 4/1995 Kaneishi .............. B29C 45/1704
428/156
6,244,653 B1   6/2001 Nishio et al.
(Continued)

FOREIGN PATENT DOCUMENTS

DE   102005038469 A1   2/2007
EP       0517613 A1   12/1992
(Continued)

OTHER PUBLICATIONS

JPS6335323 machine translation (Year: 1988).*
(Continued)

*Primary Examiner* — Timothy Kennedy
*Assistant Examiner* — Alexander A Wang
(74) *Attorney, Agent, or Firm* — Cantor Colburn LLP

(57) ABSTRACT

A method of injection molding parts, including: injecting a first thermoplastic polymer into a first cavity; forming a ribbed structure comprising ribs in the first cavity, wherein each rib in the ribbed structure includes a microstructure on an outer portion of a rib; and reducing the surface imperfections in the part by overmolding a layer formed in the second cavity onto a portion of a rib by injecting a second thermoplastic polymer into the second cavity, wherein the overmolding occurs at an interface between the layer and the ribbed structure; or injecting a first thermoplastic polymer into a first cavity; forming a layer in the first cavity; and overmolding a ribbed structure comprising ribs formed in the second cavity onto a portion of the layer formed in the first cavity. In further variations gas is injected into a microchannel formed at the interface or a foaming agent is applied in the first thermoplastic polymer.

16 Claims, 21 Drawing Sheets

(51) Int. Cl.
| | |
|---|---|
| *B29C 44/06* | (2006.01) |
| *B29C 44/08* | (2006.01) |
| *B29L 31/30* | (2006.01) |
| *B29K 105/00* | (2006.01) |
| *B29K 101/12* | (2006.01) |
| *B29K 27/18* | (2006.01) |
| *B29K 27/06* | (2006.01) |
| *B29K 33/04* | (2006.01) |
| *B29K 71/00* | (2006.01) |
| *B29K 55/02* | (2006.01) |
| *B29K 69/00* | (2006.01) |
| *B29C 44/34* | (2006.01) |
| *B29K 105/04* | (2006.01) |

(52) U.S. Cl.
CPC .......... *B29C 45/16* (2013.01); *B29C 45/1704* (2013.01); *B29C 44/355* (2013.01); *B29C 2045/1682* (2013.01); *B29K 2023/06* (2013.01); *B29K 2027/06* (2013.01); *B29K 2027/18* (2013.01); *B29K 2033/04* (2013.01); *B29K 2055/02* (2013.01); *B29K 2069/00* (2013.01); *B29K 2071/00* (2013.01); *B29K 2101/12* (2013.01); *B29K 2105/0005* (2013.01); *B29K 2105/04* (2013.01); *B29K 2995/0097* (2013.01); *B29L 2031/3041* (2013.01)

(56) References Cited

U.S. PATENT DOCUMENTS

| | | | |
|---|---|---|---|
| 6,551,540 B1* | 4/2003 | Porter ................. | B29C 45/1635 264/255 |
| 2003/0026984 A1* | 2/2003 | Nagayama .......... | B29C 45/0005 428/367 |
| 2004/0217620 A1 | 11/2004 | Matsco et al. | |
| 2006/0068206 A1 | 3/2006 | Hala et al. | |
| 2008/0277955 A1 | 11/2008 | Sato | |
| 2011/0171459 A1 | 7/2011 | Seidel et al. | |
| 2011/0184103 A1 | 7/2011 | Seidel et al. | |
| 2012/0100377 A1 | 4/2012 | Seidel et al. | |
| 2012/0315441 A1* | 12/2012 | Bald ........................ | B29C 33/56 428/161 |
| 2016/0000570 A1* | 1/2016 | Thuliez ..................... | A61F 2/38 623/18.11 |

FOREIGN PATENT DOCUMENTS

| | | |
|---|---|---|
| EP | 2684744 A1 | 1/2014 |
| EP | 2899008 A1 | 7/2015 |
| JP | S59146826 A | 8/1984 |
| JP | S6335323 A | 2/1988 |
| WO | 2016098024 A1 | 6/2016 |

OTHER PUBLICATIONS

EP2899008 machine translation (2016) (Year: 2016).*
"Draft Angles" (2006) (Year: 2006).*
Chao S.M. et al., "Evaluation of gas pressure dynamics for gas-assisted injection molding process"; International Communications in Heat and Mass Transfer, 1999, vol. 26, No. 1, pp. 85-93.
Chen S.C. et al., "A simple model for evaluation of contribution factors to skin melt formation in gas-assisted injection molding", International Communications in Heat and Mass Transfer, 1996, vol. 23, No. 2, pp. 215-224.
Chen S.C. et al., "Analysis and experimental study of gas penetration in a gas-assisted injection-molded spiral tube", Journal of Applied Polymer Science, 1995, vol. 58, pp. 793-799.
Chen S.C. et al., "Experimental study on gas penetration characteristics in spiral tube during gas-assisted injection molding", Industrial and Engineering Chemistry Research, 1995, vol. 34, pp. 416-420.
Chen S.C. et al., "Simulation and verification of the secondary gas penetration in a gas-assisted-injection molded spiral tube", International Communications in Heat and Mass Transfer, 1995, vol. 22, No. 3, pp. 319-328.
Chen S.C. et al., "Simulation of gas penetration in thin plates designed with a semicircular gas channel during gas-assisted injection molding", International Journal of Mechanical Science, 1996, vol. 38, pp. 335-348.
Christiaanse, Jennie et al., "2K Specialisation Project—Injection Molding", ITB Precision engineering B.V., 37 pages.
European Patent No. 2684744; Date of Publication: Jan. 15, 2014; Abstract Only, 1 page.
European Patent No. 0517613; Date of Publication: Dec. 9, 1992; Abstract Only, 1 page.
German Patent No. 102005038469; Date of Publication: Feb. 15, 2007; Abstract Only, 1 page.
Haagh G.A.A.V., et al., "A 3-D Finite Element Model for Gas-Assisted Injection Molding: Simulations and Experiments", Polymer Engineering and Science, 2001, vol. 41, pp. 449-465.
International Search Report for International Application No. PCT/IB2016/055708; dated Jan. 24, 2017, 7 pages.
Japanese Publication No. S59146826; Date of Publication: Aug. 22, 1984; Abstract Only, 1 page.
Japanese Publication No. S6335323; Date of Publication: Feb. 16, 1988; Abstract Only, 1 page.
Lin Y. et al., "Gas-Packing effects in external gas-assisted injection molding", Society of Plastic Engineers, 2010, 2 pages.
Lu X. et al., "Study of "Gas Fingering" Behevior in Gas-Assisted Injection Molding", Polymer Engineering ans Science, 1999, vol. 39, pp. 62-77.
Parvez M. A. et al, "Gas assisted injection molding: the effects of process variables and gas channel geometry", Materials Processing Technology, 2002, vol. 121, pp. 27-35.
Potente H. et al., "Foam Formation in Gas-Assisted injection molding Parts: Theoretical and Experimental Considerations", Polymer Engineering and Science, 1996, vol. 36, pp. 2163-2171.
Qin X. et al., "Rheology Studies of Foam Flow During Injection Mold Filling", Polymer Engineering and Science, 2007, pp. 522-529.
Written Opinion of the International Search Report for International Application No. PCT/IB2016/055708; dated Jan. 24, 2017, 9 pages.
Yang S. Y. et al., "A study of Rib Geometry for Gas-Assisted Injection Molding", Polymer Engineering ans Science, 1996, vol. 36, pp. 2824-2831.
Yang S.Y. et al., "Secondary Gas Penetration in Ribs Full-Shot Gas-Assisted Injection Moulding", Advanced Polymer Technology, 2003, vol. 22, pp. 225-237.
Priyadarshi et al., "Manufacturing Multi-Material Articulated Plastic Products Using In-Mold Assembly," Int J. Adv. Manufacturing Technology (2007) 32: pp. 350-365.

* cited by examiner

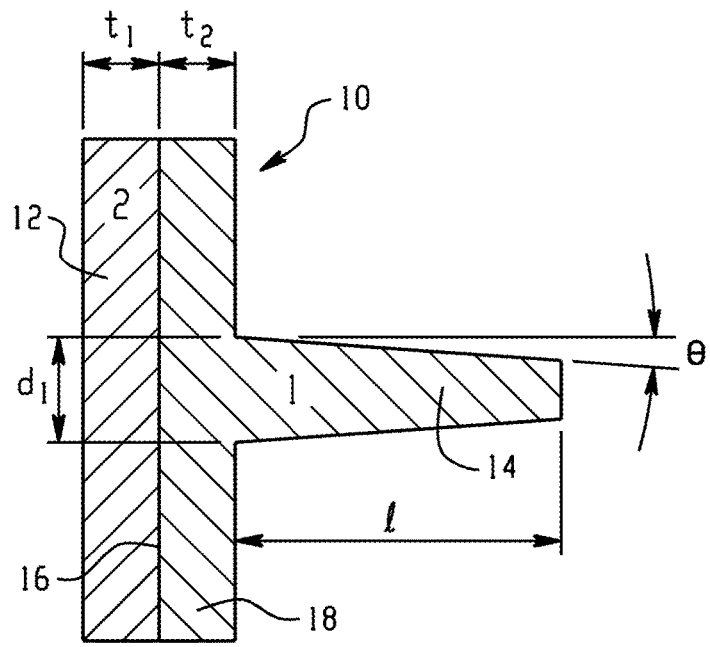
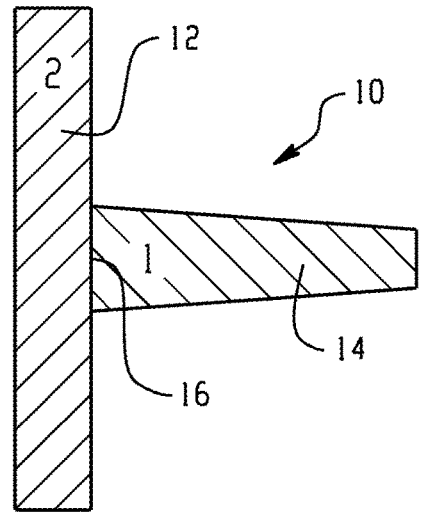
Fig. 1A
Fig. 1B
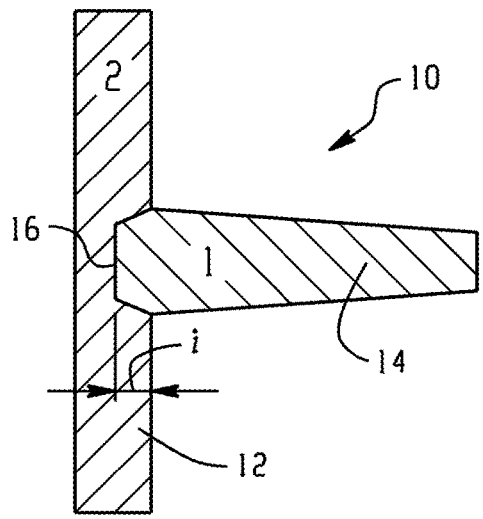
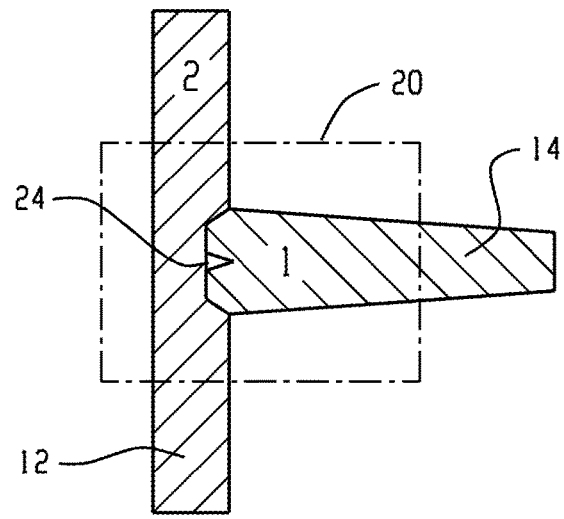
Fig. 1C
Fig. 1D

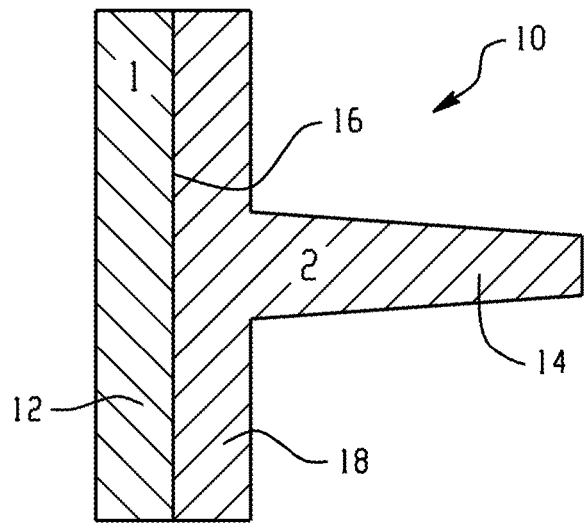
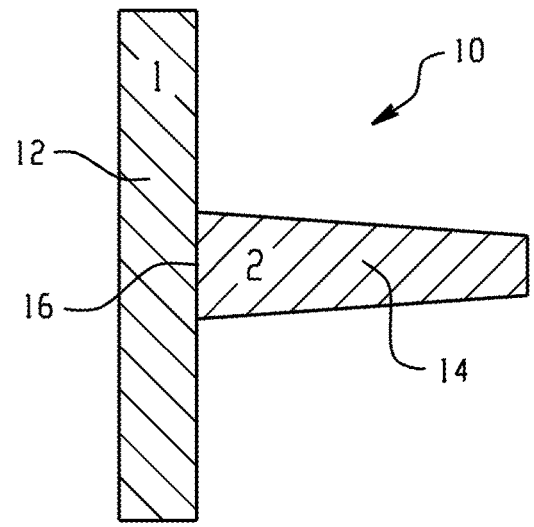
Fig. 1E
Fig. 1F
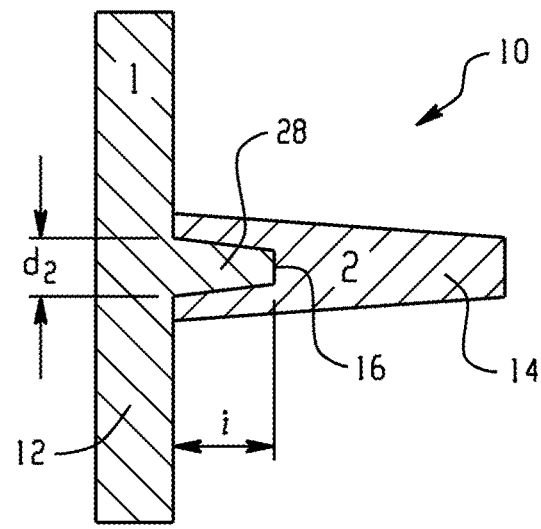
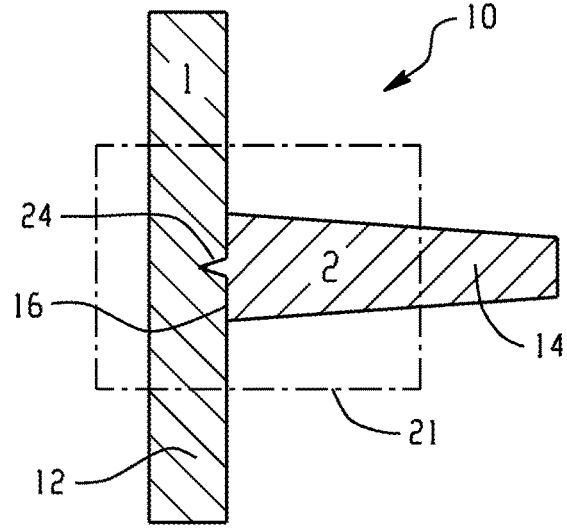
Fig. 1G
Fig. 1H

METHOD OF INJECTION MOLDING USING RIBS AND APPARATUS THEREFOR

CROSS REFERENCE TO RELATED APPLICATIONS

This application is a 371 of International Application No. PCT/IB2016/055708, filed Sep. 23, 2016, which claims priority to U.S. Application No. 62/232,510, filed Sep. 25, 2015, both of which are incorporated herein by reference in their entirety.

BACKGROUND

Injection molded parts with structural ribs often suffer from sink marks caused by uneven temperature distribution in the parts. The uneven temperature distribution causes hot spots at the junction where the rib is attached to the part. Since the material mass is larger at this junction, it requires a longer cooling time, which will cause this portion to shrink more than surrounding portions. The presence of such sink marks makes it impossible to mold injection molded parts with a Class A surface finish.

New methods are needed in order to injection mold parts including structural ribs with a Class A surface finish.

BRIEF DESCRIPTION

A method of reducing surface imperfections in an injection molded part, comprises: injecting a first thermoplastic polymer into a first cavity; forming a ribbed structure comprising ribs in the first cavity, wherein each rib in the ribbed structure includes a microstructure on an outer portion of a rib; and reducing the surface imperfections in the part by overmolding a layer formed in the second cavity onto a portion of a rib by injecting a second thermoplastic polymer into the second cavity, wherein the overmolding occurs at an interface between the layer and the ribbed structure; or injecting a first thermoplastic polymer into a first cavity; forming a layer in the first cavity; and reducing the surface imperfections in the part by overmolding a ribbed structure comprising ribs formed in the second cavity onto a portion of the layer formed in the first cavity; wherein the part has a Class A surface finish.

A method of reducing surface imperfections in an injection molded part, comprises: injecting a first thermoplastic polymer into a first cavity; forming a ribbed structure comprising ribs in the first cavity, wherein each rib in the ribbed structure includes a microstructure on an outer portion of a rib; overmolding a layer formed in a second cavity by injecting a second thermoplastic polymer into the second cavity at an interface between the layer and the ribbed structure, wherein the interface is disposed on an outer portion of a rib including the microstructure, wherein the microstructure of the ribbed structure remains unfilled with the first thermoplastic polymer or the second thermoplastic polymer; or injecting a first thermoplastic polymer into a first cavity; forming a layer in the first cavity, wherein the layer includes a microstructure; and overmolding a ribbed structure comprising ribs formed in a second cavity by injecting a second thermoplastic polymer into the second cavity, wherein the overmolding occurs at an interface between the layer and the ribbed structure, wherein the interface is disposed on an outer portion of the layer including the microstructure, wherein the microstructure of the layer remains unfilled with the first thermoplastic polymer or the second thermoplastic polymer; forming a microchannel at the interface between the layer and the microstructure or at the interface between the ribbed structure and microstructure; injecting a gas into the microchannel; and enlarging the microchannel with the gas forming an open channel to reduce the amount of shrinkage experienced by the part.

A method of reducing surface imperfections in an injection molded part, comprises: mixing a foaming agent with a first thermoplastic polymer; melting the thermoplastic polymer to form a melt including the foaming agent; injecting the melt into a first cavity; nucleating bubbles in the melt to produce cells; forming a ribbed structure including an outer layer and ribs disposed on the outer layer in the first cavity, wherein the ribbed structure comprises an expanded layer; injecting a second thermoplastic polymer into a second cavity; and reducing the surface imperfections in the part by overmolding a second layer formed in a second cavity by injecting a second thermoplastic polymer into the second cavity, wherein the overmolding occurs adjacent to the outer layer of the ribbed structure.

A method of reducing surface imperfections in an injection molded part, comprises: melting a first thermoplastic polymer to form a melt in a barrel of an injection molding machine; injecting a foaming agent into the barrel; mixing the melt and the foaming agent; injecting the melted thermoplastic polymer and the foaming agent into a first cavity; forming a ribbed structure including an outer layer and ribs disposed on the outer layer in the first cavity, wherein the ribbed structure comprises an expanded, foamed structure throughout the layer and the ribs; and overmolding a second layer formed in a second cavity by injecting a second thermoplastic polymer into the second cavity, wherein the overmolding occurs adjacent to the outer layer of the ribbed structure, wherein the part has a Class A surface finish.

BRIEF DESCRIPTION OF THE DRAWINGS

Refer now to the figures, which are exemplary embodiments, and wherein the like elements are numbered alike.

FIG. 1A is an illustration of a molding sequence where a ribbed structure is formed first and a layer is formed second.

FIG. 1B is an illustration of a molding sequence where a ribbed structure is formed first and a layer is formed second.

FIG. 1C is an illustration of a molding sequence where a ribbed structure is formed first and a layer is formed second.

FIG. 1D is an illustration of a molding sequence where a ribbed structure is formed first and a layer is formed second.

FIG. 1E is an illustration of a molding sequence where a layer is formed first and a ribbed structure is formed second.

FIG. 1F is an illustration of a molding sequence where a layer is formed first and a ribbed structure is formed second.

FIG. 1G is an illustration of a molding sequence where a layer is formed first and a ribbed structure is formed second.

FIG. 1H is an illustration of a molding sequence where a layer is formed first and a ribbed structure is formed second.

DETAILED DESCRIPTION

Figure 2A:
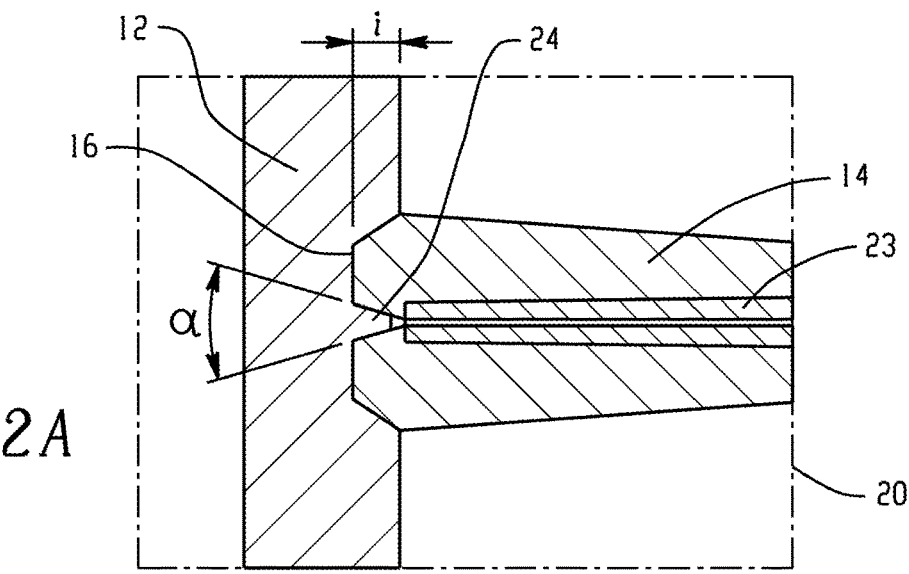
FIG. 2A is an illustration of the boxed portion of FIG. 1D during the molding cycle.

Obtaining a homogenous temperature distribution in a part with structural ribs (e.g., structural stiffening ribs) can be obtained with a two-component injection molding technique that can assist in dissipating heat from the injection molding cycle trapped between the structural ribs and a layer of the part. With the two-component injection molding technique disclosed herein, an injection molded part containing structural ribs can have a Class A surface finish. Injection molded parts shrink during the cooling portion of an injection molding cycle because the thermoplastic polymers used to make the part shrink inside the mold cavity during the cooling process. When an injection molded part contains ribs, a larger mass of material is present at junction between the rib and the layer to which it is attached. This larger mass of material will shrink more than the surrounding material, thereby creating a sink mark along a length of the rib. Additionally, because of the larger mass of material at the junction, a hot spot in the part is formed, which can remain even minutes after molding, thereby increasing the visual defects in the part, such as increasing localized shrinkage (e.g., shrinkage at the rib position).

Runner design can be adjusted to overcome sink mark issues in injection molded parts. For example, a thicker runner, e.g., a runner having a thickness 2 to 5 times larger than the thickness of the wall part, can be used to slightly overcome sink mark issues by making the packing phase more effective in allowing the core to remain fluid for a longer period of time during the injection molding cycle thereby allowing polymer to flow through the core toward shrinking thick parts where additional polymer is needed to compensate for the shrinkage. Ribs can also be designed so that the rib thickness does not exceed 60% of the wall thickness. For example, when a rib has a thickness that is smaller than a corresponding wall thickness, the intersecting point between the rib and the wall can be smaller, but it is bigger than the intersecting point between the rib and the wall and thus, sink marks can still be present.

Another technique to assist in removal of sink marks is gas assisted injection molding (GAIM). In standard gas assisted injection molding, a cavity is first filled for approximately 70% volume with a thermoplastic polymer following with the injection of an inert gas, such as nitrogen, through the still hot core of the runner system. The resulting pressurized gas-core does not shrink and compensates for shrinkage of the polymer covering the walls due to the open channel created from the gas injection point to the end of the product. Gas break through (e.g., when the gas reaches the melt flow front and overtakes it, gas breaks through a hole in the product is created) can provide unreliability to the gas assisted injection molding process and can restrict the maximum wall thickness that can be molded. Alternative techniques can include an overspill process where, after filling and packing of the mold and an overspill volume, a gate is opened to allow gas penetration from a back end of the overspill to displace melt from the core of the overspill volume to compensate for shrinkage in the mold volume. A melt push-back process can remove the need for an overspill. The melt-push back process can use the gas injection location positioned at the end of the fill, displacing the melt back into the machine barrel during gas injection, thereby allowing the production of hollow products and reducing material waste. However, since gas follows the path of least resistance, if the mold is hotter or cooler in one section, it can cause the gas channel to spread or branch into smaller channels, creating a fingering effect. This means that this technique can be useful for 1-dimensional parts such as suitcase handles or simple parts with only one continuous rib.

Another technique to assist in compensating for shrinkage after the injection gate solidifies and packing via pressuring the runner system is no longer possible is foamed injection molding. Different types of foaming systems are possible. For example, chemical foaming can use a foaming agent mixed with the thermoplastic pellets before entering the hopper of the injection molding machine, while physical foaming can utilize nitrogen or carbon dioxide injected into the molten polymer inside the barrel where the two are mixed to obtain a fine distribution of the gas.

Another technique to assist in compensating for shrinkage is external gas assisted injection molding in which gas pressure is applied on a back side of the part instead of hollowing the part.

The injection molding techniques disclosed herein can assist in solving problems caused by heat mass at the junction where ribs are attached to a layer of a part. To obtain a more homogeneous temperature distribution in a part with structural stiffening ribs, e.g., even minutes after molding has finished, a two-component injection molding process can be used to separate the heat between the ribbed structure and the layer, wherein the formed part can have a Class A surface finish. The formed part can have reduced shrinkage as compared to a part made by another injection molding process (e.g., conventional injection molding). The formed part can have less warpage as compared to a part made by another injection molding process.

As used herein, the term "Class A surface" is given the general meaning known in the art and refers to a surface substantially free of visible defects such as hair-lines, pinholes and the like. For example, a Class A surface can include a gloss of greater than 100 units at either 20° or 60°, a wavescan of less than 5 units (long as well as short), and a distinctness of image (DOI) of greater than 95 units.

A method of reducing surface imperfection in an injection molded part can include, injecting a first thermoplastic polymer into a first cavity and forming a ribbed structure comprising ribs in the first cavity. A second thermoplastic polymer can be injected into a second cavity. Surface imperfections can be reduced by overmolding a layer formed in the second cavity onto a portion of a rib on the ribbed structure when the second thermoplastic polymer is injected. The rib can intrude into a portion of the layer. The injection molded part can have a Class A surface finish.

A method of reducing surface imperfections in an injection molded part to produce a part with a Class A surface finish can include injecting a first thermoplastic polymer into a first cavity and forming a layer in the first cavity. A second thermoplastic polymer can then be injected into a second cavity. The amount and/or degree of surface imperfections present on the layer can be reduced by overmolding a ribbed structure including ribs where the ribbed structure is formed in the second cavity onto a portion of the layer formed in the first cavity. The layer can intrude into a portion of the ribbed structure.

A method of reducing surface imperfections in an injection molded part can include injecting a first thermoplastic polymer into a first cavity, forming a ribbed structure comprising ribs in the first cavity. Each rib can include a microstructure on an outer portion of a rib. A second thermoplastic polymer can then be injected into a second cavity by overmolding a layer at an interface between the layer and the ribbed structure. The interface can be disposed on an outer portion of a rib including the microstructure. The microstructure can remain unfilled with the first thermoplastic polymer or the second thermoplastic polymer. A microchannel can be formed at the interface between the layer and the microstructure. A gas (e.g., nitrogen) can be injected into the microchannel. The microchannel can be enlarged with the gas forming an open channel to reduce the amount of shrinkage experienced by the part.

A method of reducing surface imperfections in an injection molded part can include injecting a first thermoplastic polymer into a first cavity, forming a layer in the first cavity. A second thermoplastic polymer can then be injected into a second cavity to form ribbed structure comprising ribs in the second cavity. Each layer can include a microstructure located on a portion of the interface with the ribbed structure. The ribbed structure can be overmolded to the layer at an interface between the layer and the ribbed structure. The interface can be disposed on an outer portion of a rib including the microstructure. The microstructure can remain unfilled with the first thermoplastic polymer or the second thermoplastic polymer. A microchannel can be formed at the interface between the layer and the microstructure. A gas (e.g., nitrogen) can be injected into the microchannel. The microchannel can be enlarged with the gas forming an open channel to reduce the amount of shrinkage experienced by the part.

A depth of the overlap (i.e., intrusion) between the ribbed structure and the layer or between the layer and the ribbed structure at the respective overmolded portions can be greater than or equal to 0.5 millimeter (mm), for example, greater than or equal to 1 mm, for example, greater than or equal to 2.5 mm, for example, greater than or equal to 5 mm. For example, the overlap, whether between the ribbed structure and the layer or between the layer and ribbed structure can be 0.5 mm to 10 mm, for example, 1 mm to 5 mm, for example, 2.5 mm to 4 mm.

A method of reducing surface imperfections in a molded part through the use of chemical foaming can include mixing a foaming agent with a first thermoplastic polymer and melting the thermoplastic polymer to form a melt including the foaming agent. Melt can be injected into a first cavity and bubbles can be nucleated in the melt to produce cells. A ribbed structure can then be formed including an outer layer and ribs disposed on the outer layer in the first cavity. The ribbed structure can comprise an expanded layer. A second thermoplastic polymer can then be injected into a second cavity. Surface imperfections can be reduced by overmolding a second layer formed in the second cavity adjacent to the outer layer of the ribbed structure.

A method of reducing surface imperfections in an injection molded part can include the use of physical foaming wherein a first thermoplastic polymer is melted in barrel of an injection molding machine to form a melt. A foaming agent can then be injected into the barrel and the melt and the foaming agent mixed. A ribbed structure can be formed including an outer layer and ribs disposed on the outer layer in the first cavity. The ribbed structure can include an expanded, foamed structure throughout the layer and the ribs. A second thermoplastic material can then be injected into the second cavity and a second layer can be overmolded adjacent to the outer layer of the ribbed structure. The part can have a Class A surface finish.

The foaming agent can include at least one of carbon dioxide, sodium bicarbonate, azide compounds, ammonium carbonate, ammonium nitrite, monosodium citrate, light metals which evolve hydrogen upon reaction with water, chlorinated hydrocarbons, chlorofluorocarbons, azodicarbonamide, N,N'dinitrosopentamethylenetetramine, trichloromonofluoromethane, trichlorotrifluoroethane, methylene chloride, organic carboxylic acids, pentane, butane, ethanol, acetone, nitrogen gas (N2), and ammonia gas.

The first thermoplastic polymer or the second thermoplastic can be the same or different. The first thermoplastic polymer or the second thermoplastic polymer can include a thermoplastic polymer (e.g., including an oligomer), a metallic material, glass, or a combination including at least one of the foregoing. The polymeric material can have any microstructure including branched units. Possible polymeric resins that can be employed include, but are not limited to, oligomers, polymers, ionomers, dendrimers, copolymers such as graft copolymers, block copolymers (e.g., star block copolymers, random copolymers, etc.) and combinations comprising at least one of the foregoing. Examples of such polymeric resins include, but are not limited to, polycarbonates (e.g., blends of polycarbonate (such as, polycarbonate-polybutadiene blends, copolyester polycarbonates)), polystyrenes (e.g., copolymers of polycarbonate and styrene, polyphenylene ether-polystyrene blends), polyimides (e.g., polyetherimides), acrylonitrile-styrene-butadiene (ABS), polyalkylmethacrylates (e.g., polymethylmethacrylates), polyesters (e.g., copolyesters, polythioesters), polyolefins (e.g., polypropylenes and polyethylenes, high density polyethylenes, low density polyethylenes, linear low density polyethylenes), polyamides (e.g., polyamideimides), polyarylates, polysulfones (e.g., polyarylsulfones, polysulfonamides), polyphenylene sulfides, polytetrafluoroethylenes, polyethers (e.g., polyether ketones, polyether etherketones, polyethersulfones), polyacrylics, polyacetals, polybenzoxazoles (e.g., polybenzothiazinophenothiazines, polybenzothiazoles), polyoxadiazoles, polypyrazinoquinoxalines, polypyromellitimides, polyquinoxalines, polybenzimidazoles, polyoxindoles, polyoxoisoindolines (e.g., polydioxoisoindolines), polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyls (e.g., polyvinyl ethers, polyvinyl thioethers, polyvinyl alcohols, polyvinyl ketones, polyvinyl halides, polyvinyl nitriles, polyvinyl esters, polyvinylchlorides), polysulfonates, polysulfides, polyureas, polyphosphazenes, polysilazzanes, polysiloxanes, and combinations comprising at least one of the foregoing.

More particularly, the first thermoplastic polymer or the second thermoplastic polymer can include, but is not limited to, polycarbonate resins (e.g., LEXAN™ resins, commercially available from SABIC's Innovative Plastics business such as LEXAN™ XHT, LEXAN™ HFD, etc.), polyphenylene ether-polystyrene blends (e.g., NORYL™ resins, commercially available from SABIC's Innovative Plastics business), polyetherimide resins (e.g., ULTEM™ resins, commercially available from SABIC's Innovative Plastics business), polybutylene terephthalate-polycarbonate blends (e.g., XENOY™ resins, commercially available from SABIC's Innovative Plastics business), copolyestercarbonate resins (e.g. LEXAN™ SLX or LEXAN™ FST resins, commercially available from SABIC's Innovative Plastics business), acrylonitrile butadiene styrene resins (e.g., CYCOLOY™ resins, commercially available from SABIC's Innovative Plastics business), polyetherimide/siloxane resins (e.g., SILTEM™, commercially available from SABIC's Innovative Plastics business), polypropylene resins, for example, long glass fiber filled polypropylene resins (e.g., STAMAX™ resins, commercially available from SABIC's Innovative Plastics business), and combinations comprising at least one of the foregoing resins.

Even more particularly, the thermoplastic polymers can include, but are not limited to, homopolymers and copolymers of a polycarbonate, a polyester, a polyacrylate, a polyamide, a polyetherimide, a polyphenylene ether, or a combination comprising at least one of the foregoing resins. The polycarbonate can comprise copolymers of polycarbonate (e.g., polycarbonate-polysiloxane, such as polycarbonate-polysiloxane block copolymer), linear polycarbonate, branched polycarbonate, end-capped polycarbonate (e.g., nitrile end-capped polycarbonate) blends of PC, such as PC/ABS blend, and combinations comprising at least one of the foregoing, for example a combination of branched and linear polycarbonate.

The first thermoplastic polymer or the second thermoplastic polymer can include various additives ordinarily incorporated into polymer compositions of this type, with the proviso that the additive(s) are selected so as to not significantly adversely affect the desired properties of the injection molded part. Such additives can be mixed at a suitable time during the mixing of the thermoplastic polymer for the part. Exemplary additives include impact modifiers, fillers, reinforcing agents, antioxidants, heat stabilizers, light stabilizers, ultraviolet (UV) light stabilizers, plasticizers, lubricants, mold release agents, antistatic agents, colorants (such as carbon black and organic dyes), surface effect additives, anti-ozonants, thermal stabilizers, anti-corrosion additives, flow promoters, pigments, dyes radiation stabilizers (e.g., infrared absorbing), flame retardants, and anti-drip agents. A combination of additives can be used, for example a combination of a heat stabilizer, mold release agent, and ultraviolet light stabilizer. In general, the additives are used in the amounts generally known to be effective. The total amount of additives (other than any impact modifier, filler, or reinforcing agent) is generally 0.001 wt % to 5 wt %, based on the total weight of the polymeric material composition.

The ribs can have various measurements. For example, a diameter or a rib can be greater than or equal to 0.5 mm, for example, greater than or equal to 1.5 mm, for example, greater than or equal to 2.5 mm, for example, greater than or equal to 5 mm. For example, a diameter of a rib can be 0.5 mm to 10 mm, for example, 1.5 mm to 7.5 mm, for example, 2.5 mm to 5 mm. A length of a rib can be 5 mm to 100 mm, for example, 10 mm to 50 mm, for example, 15 mm to 30 mm, for example 20 mm to 25 mm. A draft angle of a rib measured along the length of the rib can be less than or equal to 5°, for example, 1° to 5°, for example, 1.5° to 4°.

A thickness of the layer or the second layer can be 0.5 mm to 50 mm, for example, 1 mm to 25 mm, for example, 2 mm to 15 mm, for example, 5 mm to 10 mm.

The microstructure can include any geometrical shape for the cross-section. For example, the microstructure can include a cross-sectional shape that is triangular, square, trapezoidal, hexagonal, pentagonal, circular, oval, elliptical, crescent, curvilinear triangle, parallelogram, rectangular, diamond, rhombus, heptagonal, octagonal, nonagonal, or decagonal.

During the molding process, a temperature of the first cavity can be greater than a glass transition temperature of the first thermoplastic polymer and the temperature of the second cavity can be greater than the glass transition temperature of the second thermoplastic polymer. For example, the temperature of the first cavity can be 10° C. to 375° C., for example, 20° C. to 300° C., for example, 50° C. to 250° C., for example, 75° C. to 150° C.

A packing pressure of the second cavity can be 10 MegaPascals (MPa) to 1,500 MPa, for example, 25 MPa to 1,000 MPa, for example, 50 MPa to 500 MPa, for example, 100 MPa to 250 MPa.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIGS. 1A to 1H illustrate various embodiments of molding sequences to reduce surface imperfections, e.g., sink marks, in an injection molded part. For example, the numbers 1 and 2 in these figures refer to the mold sequence, i.e., the parts with the number 1 were molded first and the parts with the number 2 were overmolded to the parts with number 1. In FIGS. 1A to 1D, a ribbed structure 10 can be formed in a first cavity and a layer 12 can be formed in a second cavity. The layer 12 includes a Class A surface finish. The layer 12 can be molded over the ribbed structure 10 after it has cooled and solidified. In FIG. 1A, the ribbed structure 10 includes ribs 14 and ribbed structure layer 18 and can be formed in a first cavity and the layer 12 can be overmolded to the ribbed structure 10 after the ribbed structure 10 has cooled and solidified at an interface 16 between the layer 12 and the ribbed structure 10. Ribs 14 can protrude from ribbed structure layer 18. As can be seen in FIG. 1A, the interface 16 runs along an entire surface of layer 12 and ribbed structure 10. In FIG. 1B, the interface 16 is reduced in size by molding ribs 14 without ribbed structure layer 18. In FIG. 1C, the interface 16 is again reduced as compared to FIG. 1A, but in FIG. 1C, rib 14 intrudes into layer 12 to lower local heat input at the interface 16 during the second shot. The first shot occurs when the rib 14 is formed in the first cavity and the second shot occurs when layer 12 is formed in the second cavity or vice versa.

Figure 2B:
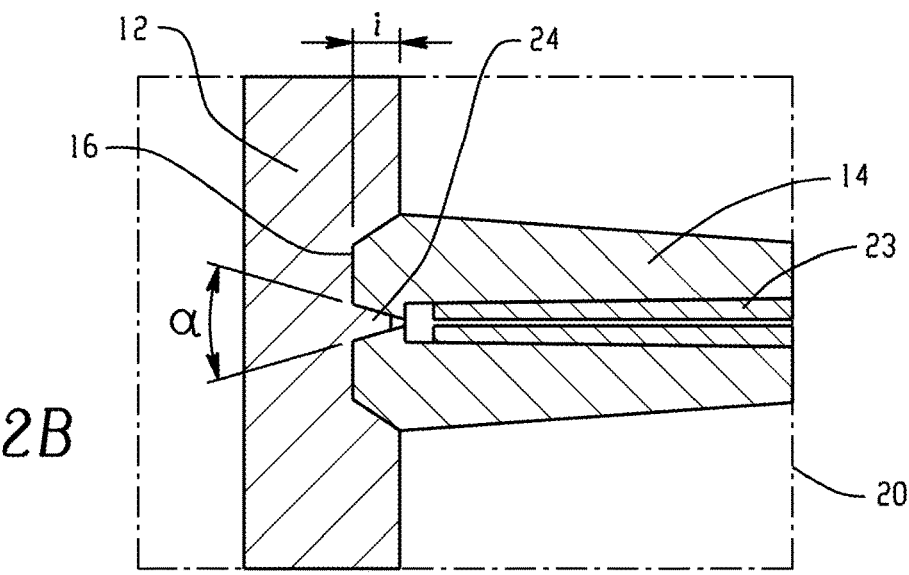
FIG. 2B is an illustration of the boxed portion of FIG. 1D during the molding cycle.
Figure 2C:
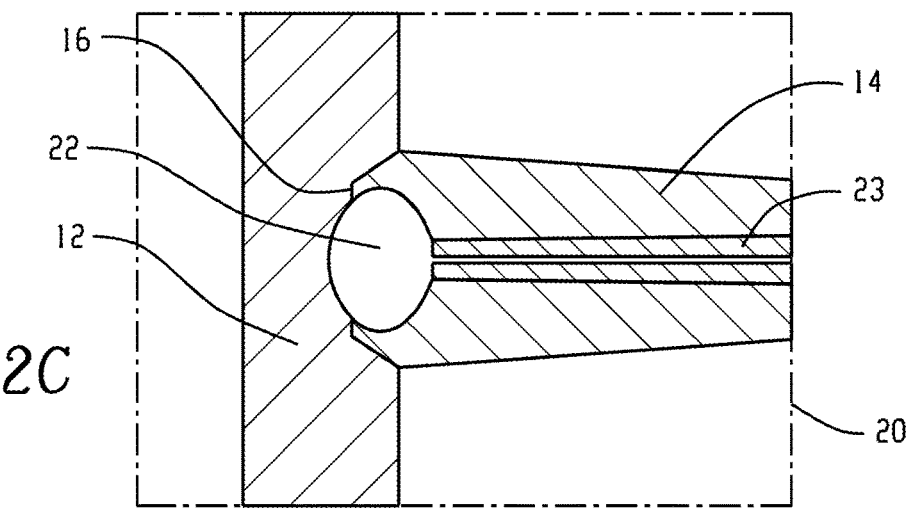
FIG. 2C is an illustration of the boxed portion of FIG. 1D during the molding cycle after the gas has been injected and microchannel formed.
Figure 2D:
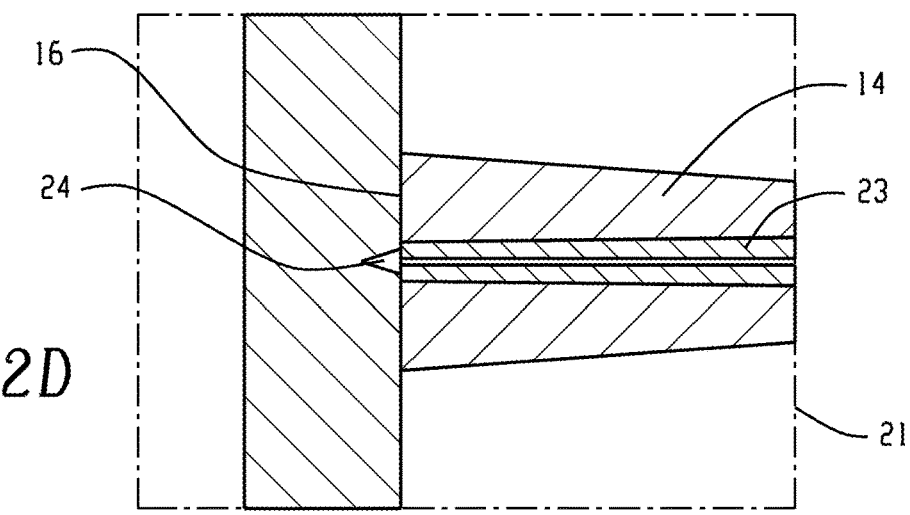
FIG. 2D is an illustration of the boxed portion of FIG. 1H during the molding cycle.
Figure 2E:
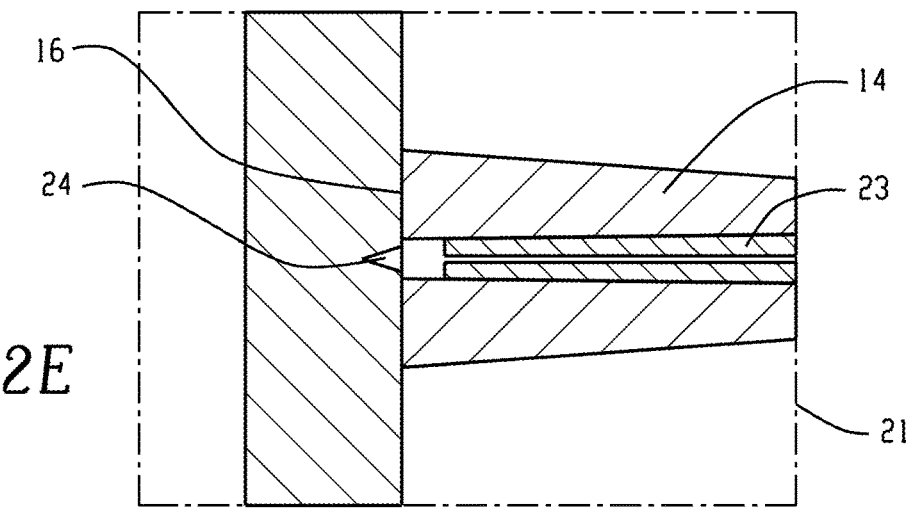
FIG. 2E is an illustration of the boxed portion of FIG. 1H during the molding cycle.

FIG. 1D illustrates an embodiment where a microstructure 24 is present at the interface 16. FIGS. 2A, 2B, and 2C are enlarged views of the boxed area 20 and illustrate expansion of the microstructure 24 to a microchannel 22 through the passage of air or an inert gas (e.g., nitrogen) through gas needle 23. A gas assisted injection molding process can be utilized in order to expand microstructure 24 into microchannel 22 (see microstructure 24 in FIG. 2A and microchannel 22 in FIG. 2C) where air or an inert gas is blown through the gas needle 23 as can be seen from FIGS. 2A to 2C. The gas needle 23 can act as a flow leader for the gas passing therethrough. As illustrated in FIGS. 1D, 2A, 2B, and 2C, in the first shot during the injection molding process, a microstructure 24 can be formed on top of rib 14. During the overmolding of layer 12, the melt will not flow into this microstructure 24, but will fill the remainder of the bottom cavity. Once the melt reaches the cavity end (i.e., has filled the bottom cavity with the exception of the microstructure 24), the material at the microstructure 24 has solidified, leaving the microstructure 24 partly unfilled. The gas needle 23 can be retracted as shown in FIG. 2B. After a period of time (e.g., after 2 seconds to 10 minutes), a hot spot can occur making the thermoplastic polymer around the microstructure 24. At this point, gas can be inserted through the gas needle 23 and the gas needle 23 can be pulled backward so that gas can be inserted around the gas needle 23. The gas can be pushed in to the microchannel 22 allowing the microchannel to act as a flow leader for the gas (see FIG. 2C).

Turning now to FIGS. 1E through 1H, a layer 12 is formed in a first cavity and a ribbed structure 10 can be formed in a second cavity or vice versa. The layer 12 includes a Class A surface finish. The layer 12 can be overmolded by the ribbed structure 10 after it has cooled and solidified. In FIG. 1E, layer 12 is formed in the first cavity and then ribbed structure 10 including ribs 14 and ribbed structure layer 18 are formed in second cavity and overmolded to the layer 12 after the layer 12 has cooled and solidified. Overmolding occurs at an interface 16 between the layer 12 and the ribbed structure 10. Ribs 14 protrude from ribbed structure layer 18. As can be seen in FIG. 1E, the interface 16 runs along an entire surface of layer 12 and ribbed structure 10. In FIG. 1F, the interface 16 is reduced in size by overmolding ribs 14 without ribbed structure layer 18 onto layer 12. In FIG. 1G, the interface 16 is again reduced as compared to FIG. 1E, but in FIG. 1G, protrusion 28 intrudes into ribbed structure 10 to lower local heat input at the interface 16 during the second shot. The first shot occurs when the layer 12 is formed in the first cavity and the second shot occurs when ribbed structure 10 is formed in the second cavity.

Figure 2F:
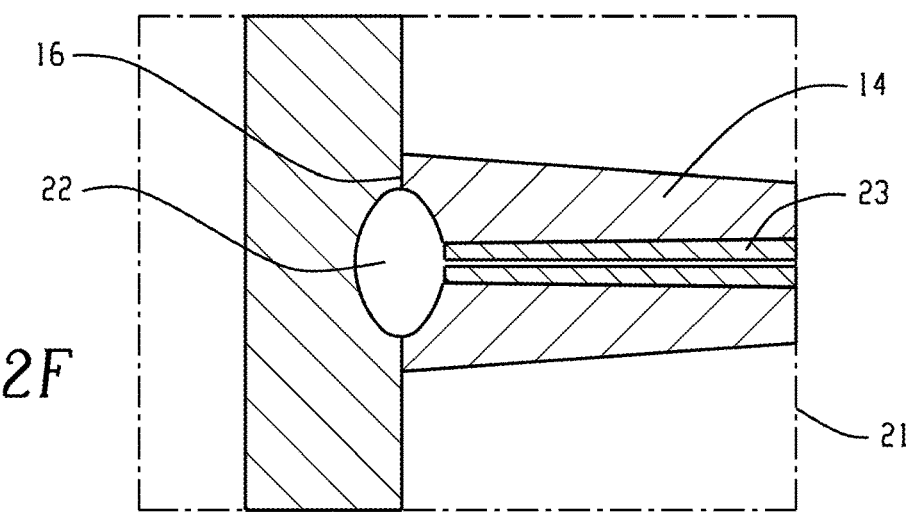
FIG. 2F is an illustration of the boxed portion of FIG. 1H during the molding cycle after the gas has been injected and microchannel formed.

FIG. 1H illustrates an embodiment where a microstructure 24 is present at the interface 16. Similarly as with the embodiment illustrated in FIG. 1D, the microstructure 24 can be enlarged with the use of gas assisted injection molding. For example, as illustrated in FIG. 2C, which is an expanded view of boxed area 21, the microstructure 24 can be expanded through the passage of air or an inert gas (e.g., nitrogen) through gas needle 23 forming microstructure 24 into microchannel 22. A gas assisted injection molding process can be utilized in order to expand microstructure 24 where air or an inert gas is blown through the gas needle 23. The gas needle 23 can act as a flow leader for the gas passing therethrough. As illustrated in FIGS. 1H and 2A-2C, in the first shot during the injection molding process, a microstructure 24 can be formed on top of layer 12. During the overmolding of layer 12, the melt will not flow into this microstructure 24, but will fill the remainder of the second cavity. Once the melt reaches the cavity end (i.e., has filled the second cavity with the exception of the microstructure 24), the material at the microstructure 24 has solidified, leaving the microstructure 24 partly unfilled. After a period of time (e.g., after 2 seconds to 10 minutes), a hot spot can occur making the thermoplastic polymer around the microstructure 24 soft again. At this point, gas can be inserted through the gas needle 23 and the gas needle 23 can be pulled backward so that gas can be inserted around the gas needle 23. The gas can be pushed into the microchannel 22 allowing the microchannel to act a flow leader for the gas (see FIG. 2F).

The ribs can have any variation of structures, including but not limited to honeycombs, webs, perpendicular, diagonal, etc. The number of ribs present is not limited and can be any number of ribs that provide the desired structural integrity to articles made from the ribs. In traditional gas assisted injection molding, parts are limited to a single rib. With the method disclosed herein, the microchannel can act as a flow leading for the gas thereby allowing for the molding of complex geometry of ribs (e.g., honeycomb, webs, rib crossings, etc.)

The ribs 14 can have various measurements as illustrated in FIGS. 1A through 1H. For example, a diameter, $d_1$, of a rib 14 can be greater than or equal to 0.5 mm, for example, greater than or equal to 1.5 mm, for example, greater than or equal to 2.5 mm, for example, greater than or equal to 3.5 mm, for example, greater than or equal to 5 mm. For example, a diameter, $d_1$, of a rib 14 can be 0.5 mm to 10 mm, for example, 1.5 mm to 7.5 mm, for example, 2.5 mm to 5 mm. A length, l, of a rib can be 5 mm to 100 mm, for example, 10 mm to 50 mm, for example, 15 mm to 30 mm, for example 20 mm to 25 mm. A draft angle, θ, of a rib 14 measured along the length, l, of the rib 14 can be less than or equal to 5°, for example, 1° to 5°, for example, 1.5° to 4°.

A thickness, $t_1$, of the layer 12 or a thickness, $t_2$, of the ribbed structure layer 18 can be 0.5 mm to 50 mm, for example, 1 mm to 25 mm, for example, 2 mm to 15 mm, for example, 5 mm to 10 mm as illustrated in FIG. 1A. Intrusion, i, can be 0.5 mm to 10 mm, for example, 1 mm to 5 mm, for example, 2 mm to 4, mm, for example, greater than or equal to 1.5 mm, for example, greater than or equal to 2.5 mm, for example, greater than or equal to 5 mm. A draft angle where microstructure 24 is formed, α, can be greater than or equal to 10°, for example, greater than or equal to 20°, for example, greater than or equal to 25°, for example, greater than or equal to 30°, for example, greater than or equal to 40°. For example, draft angle, α, can be 10° to 50°, for example, 15° to 40°, for example, 20° to 30°.

Figure 3D:
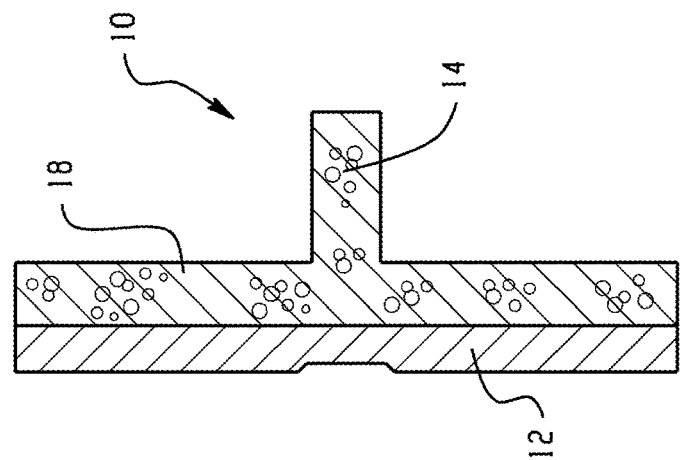
FIGS. 3A to 3D are illustrations of a molding sequence where a layer is overmolded to a foamed ribbed structure.
Figure 3C:
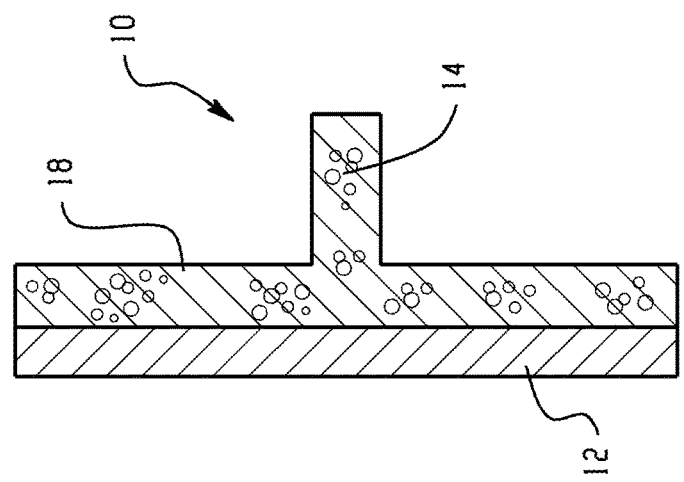
Figure 3B:
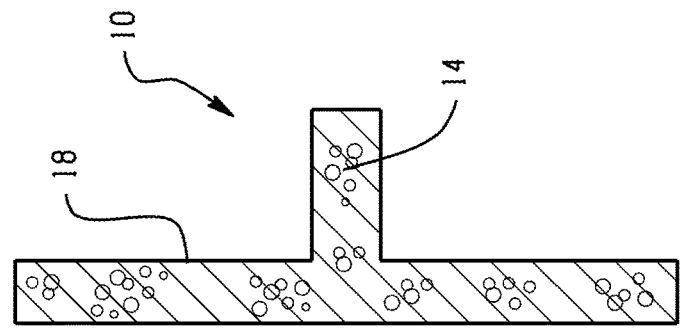
Figure 3A:
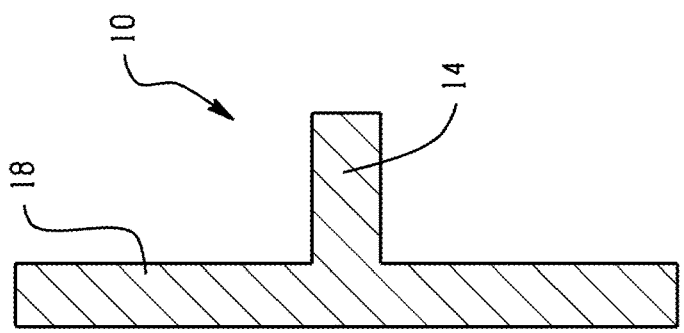

FIGS. 3A to 3D illustrate a process where foaming was used in the embodiment illustrated in FIG. 1A to assist in compensating for shrinkage. As illustrated in FIGS. 3A and 3B, a ribbed structure 10 was formed including ribs 14 and ribbed structure layer 18 in a first cavity, where the ribbed structure 10 included an expanded foamed structure throughout the ribbed structure layer 18 and the ribs 14. After the ribbed structure 10 was formed, a second thermoplastic polymer was injected into a second cavity and a second layer (layer 12) was overmolded in the second cavity adjacent to the ribbed structure layer 18 of the ribbed structure (see FIGS. 3C and 3D). As can be seen in FIG. 3D, some shrinkage can be observed in layer 12.

Figure 4:
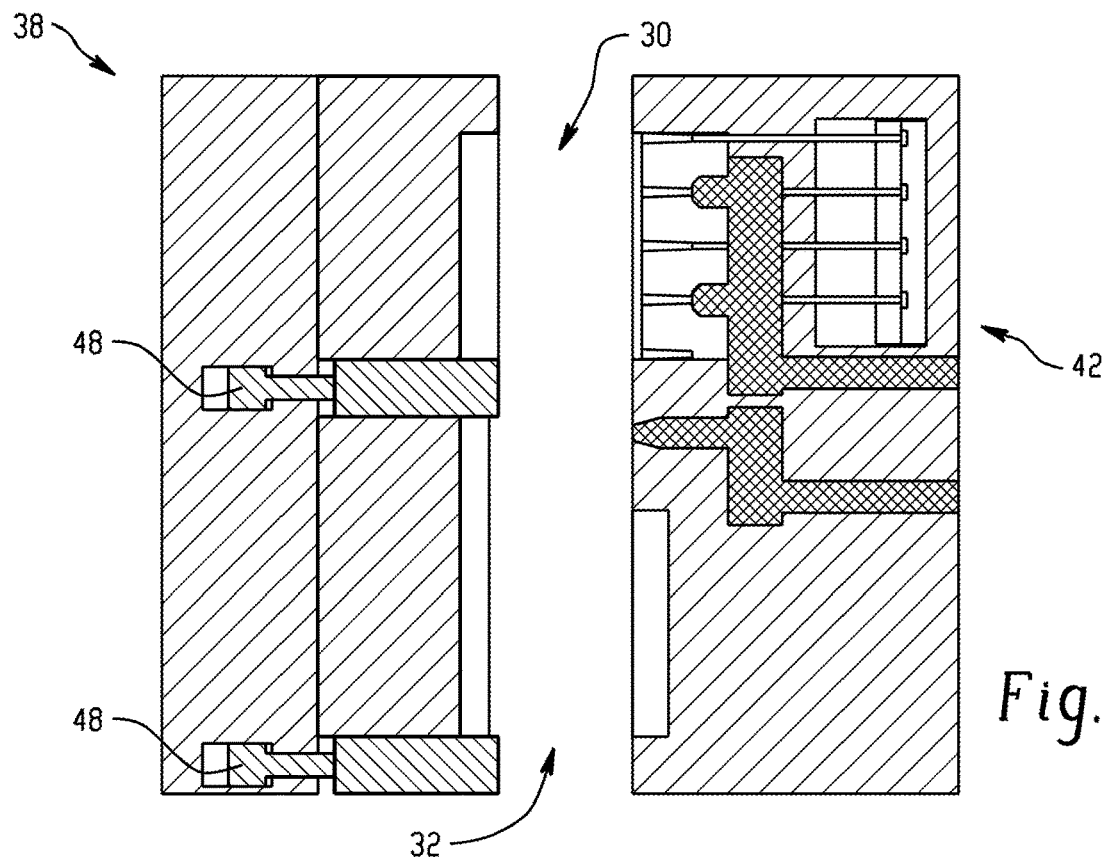
FIG. 4 is an illustration of a mold in an open position with a layer to be formed in a bottom cavity.
Figure 5:
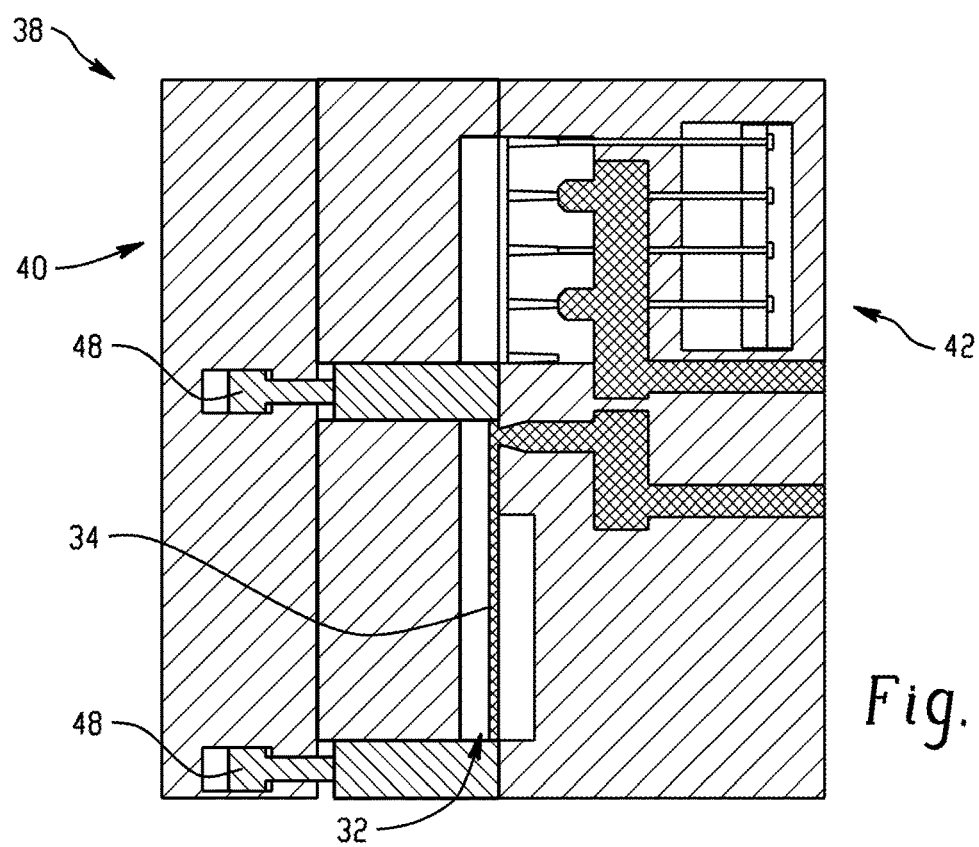
FIG. 5 is an illustration of the mold of FIG. 4 in the closed position with the layer being formed.
Figure 6:
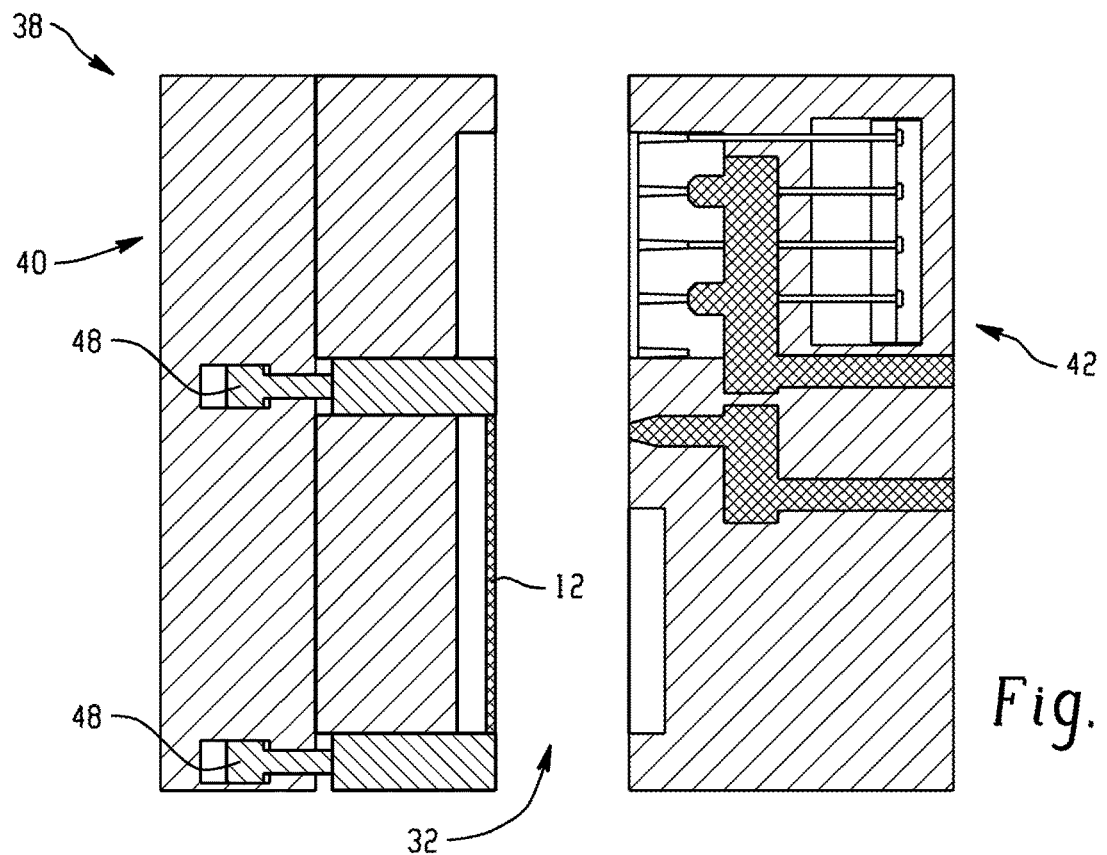
FIG. 6 is an illustration of the mold of FIG. 5 in the open position with the layer of FIG. 5 attached to a moving side of the mold.
Figure 7:
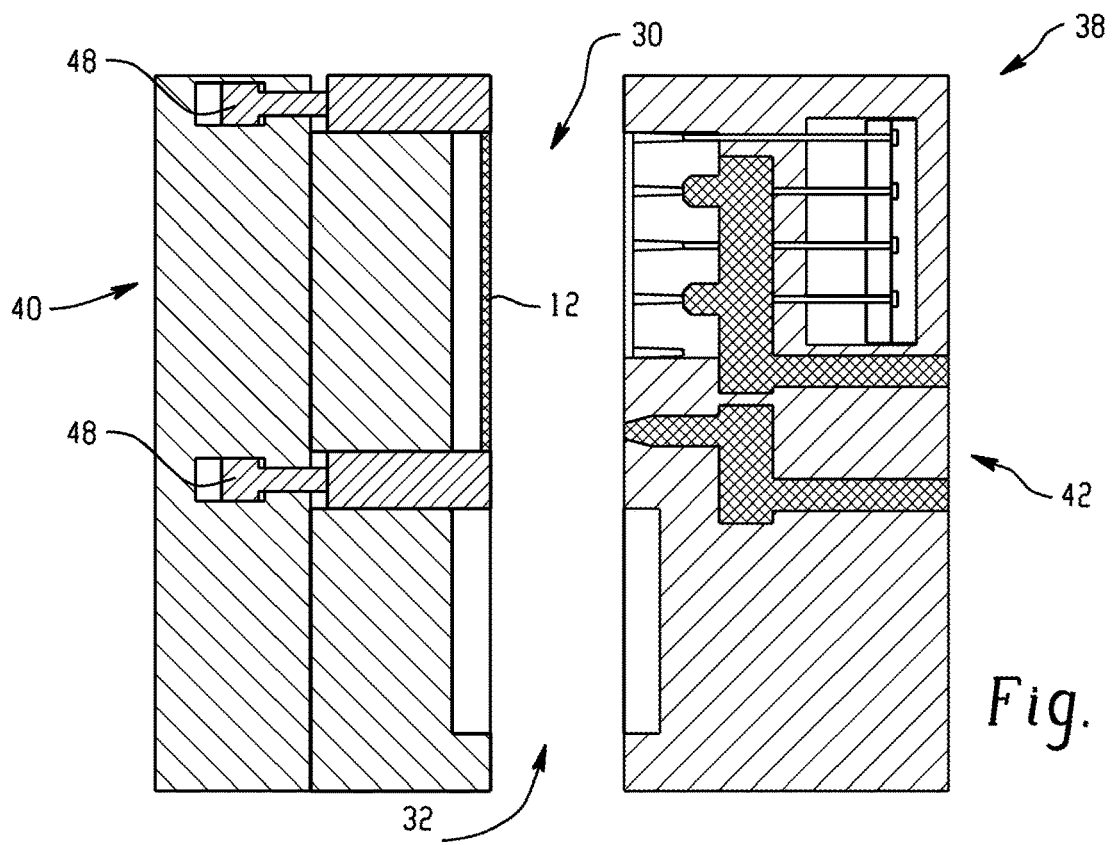
FIG. 7 is an illustration of the mold of FIG. 6 where the layer has been moved to a top cavity and a ribbed structure is to be formed in the top cavity.
Figure 8:
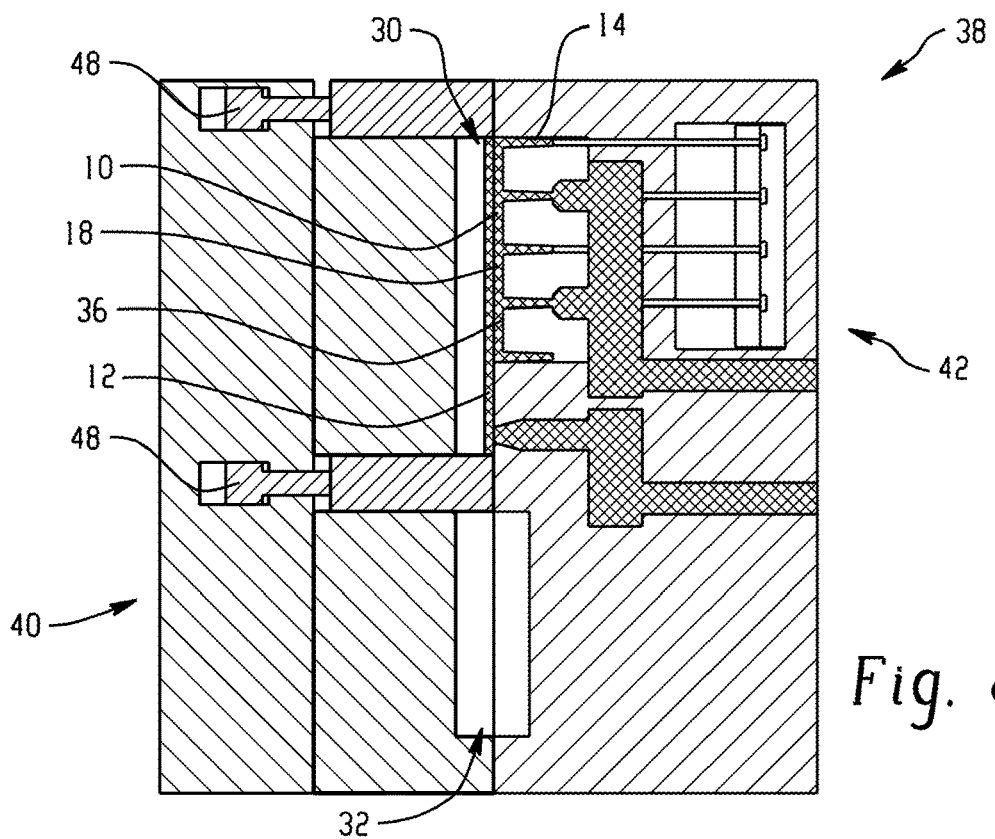
FIG. 8 is an illustration of the mold of FIG. 7 where the ribbed structure is being overmolded to the layer.

Turning now to FIGS. 4-8, a two component molding sequence is illustrated where the layer 12 is formed before the ribbed structure 10. In the following figures, reference to top cavity and bottom cavity are done merely for clarity purposes. It is to be understood that the first cavity can be the top cavity or the bottom cavity and that the second cavity can be the top cavity or the bottom cavity. In FIG. 4, a mold 38 is in an open position with a top cavity 30 (e.g. a first cavity) and a bottom cavity 32 (e.g., a second cavity). According to FIGS. 4-8, a method of making an injection molded part with reduced surface imperfections can include closing the mold 38 and injecting a first thermoplastic polymer 34 into a bottom cavity 32. As shown in FIG. 5, after injection a layer 12 is formed in the bottom cavity 32. Layer 12 can include a Class A surface finish. The mold 38 is then opened (FIG. 6) and rotated (FIG. 7) with the layer 12 attached to the moving half 40 of mold 38 as shown in FIGS. 6 and 7 so that in FIG. 7, the layer 12 is now located in the top cavity 30. After closing the mold again, a second thermoplastic polymer 36 can then be injected into the top cavity 30 as shown FIG. 8. FIG. 7 illustrates that the layer 12 can be moved to the top cavity 30 prior to closing of the mold 38 and injection of the second thermoplastic polymer 36 into the top cavity 30. Movement of layer 12 from the bottom cavity 32 to the top cavity 30 can be effected by movement of the entire mold over its horizontal axis, illustrated by line H in FIG. 7. Compression frame 48 can assist in lowering residual stress in the part by allowing for more uniform cavity pressures. More uniform cavity pressures can allow thinner parts than can be currently made to be injection molded. A ribbed structure 10 can be overmolded to the layer 12 when the second thermoplastic polymer is injected into the top cavity 30. A portion of the layer 12 can intrude into the ribbed structure 10 on the ribbed structure layer 18 of ribbed structure 10. Ribbed structure 10 can include ribs 14 disposed at an angle to the ribbed structure layer 18 and the layer 12, e.g., perpendicularly to the ribbed structure layer 18 and the layer 12. After formation of the ribbed structure 10, the Class A surface finish of the layer 12 can remain unblemished due to the ribbed structure 10 assisting in eliminating sink marks and hot spots from the part. The above described method can include the first thermoplastic polymer being injected into the bottom cavity and the second thermoplastic polymer being injected into the top cavity.

Figure 9:
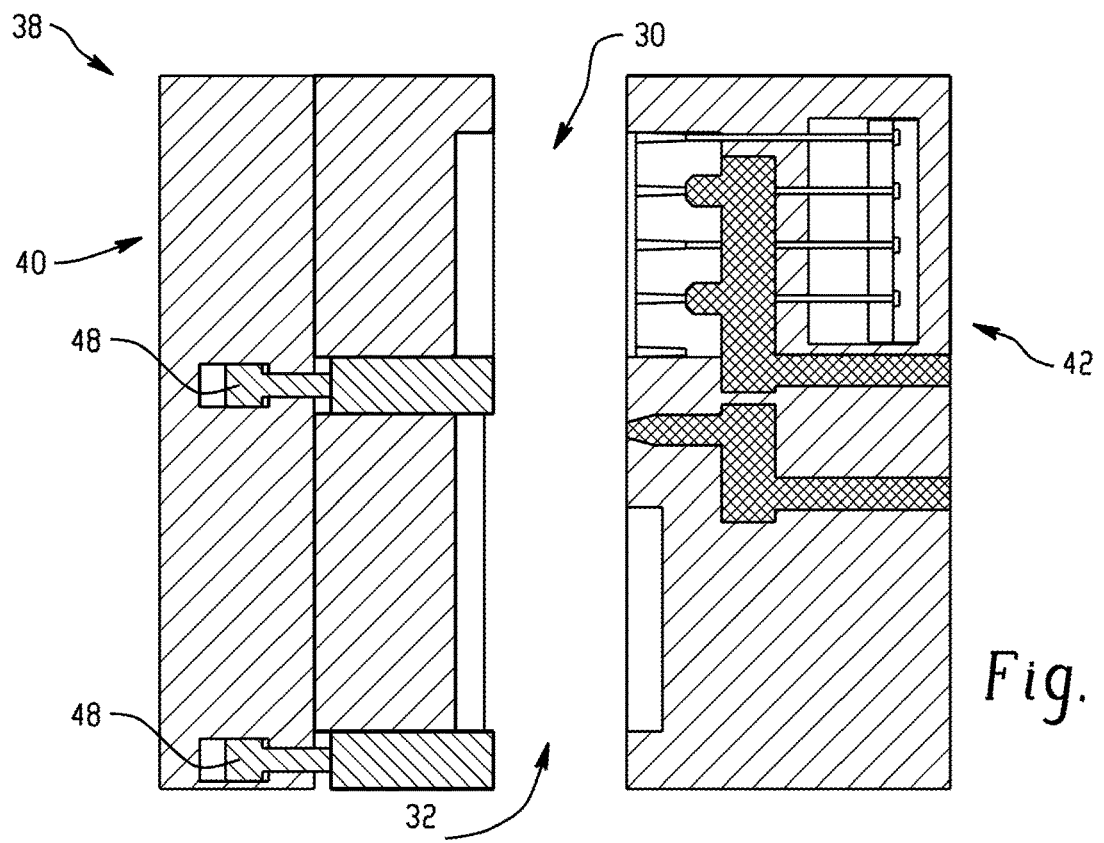
FIG. 9 is an illustration of a mold in an open position with a ribbed structure mold in a top cavity.
Figure 10:
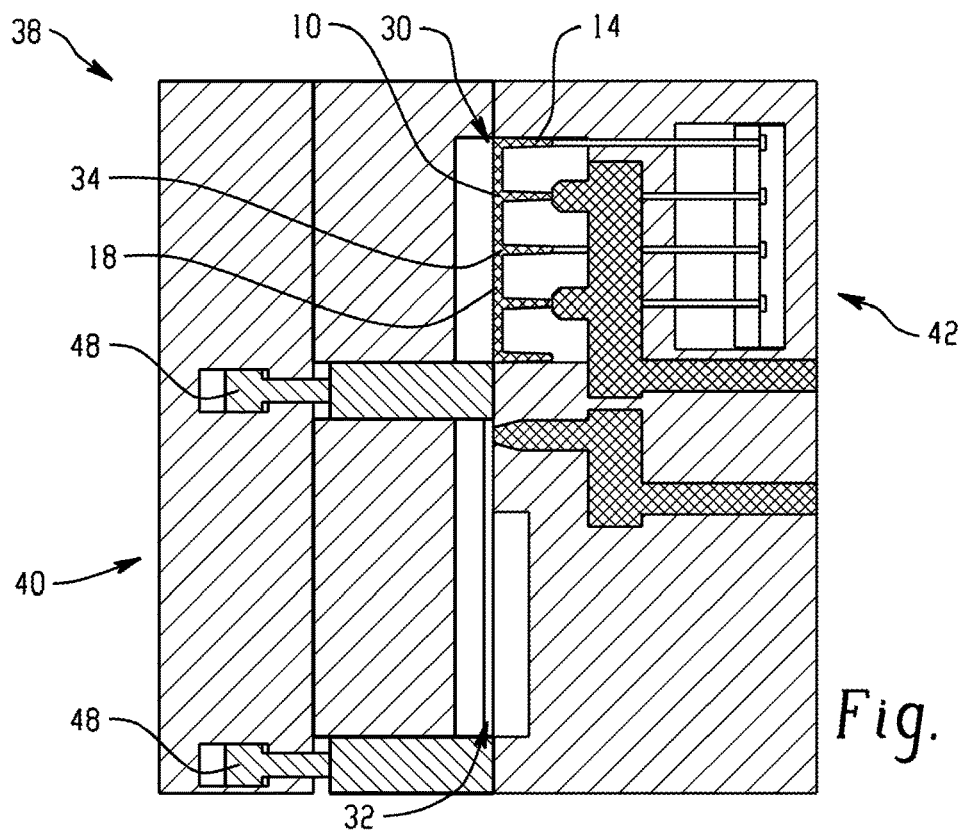
FIG. 10 is an illustration of the mold of FIG. 9 in the closed position with the ribbed structure being formed.
Figure 11:
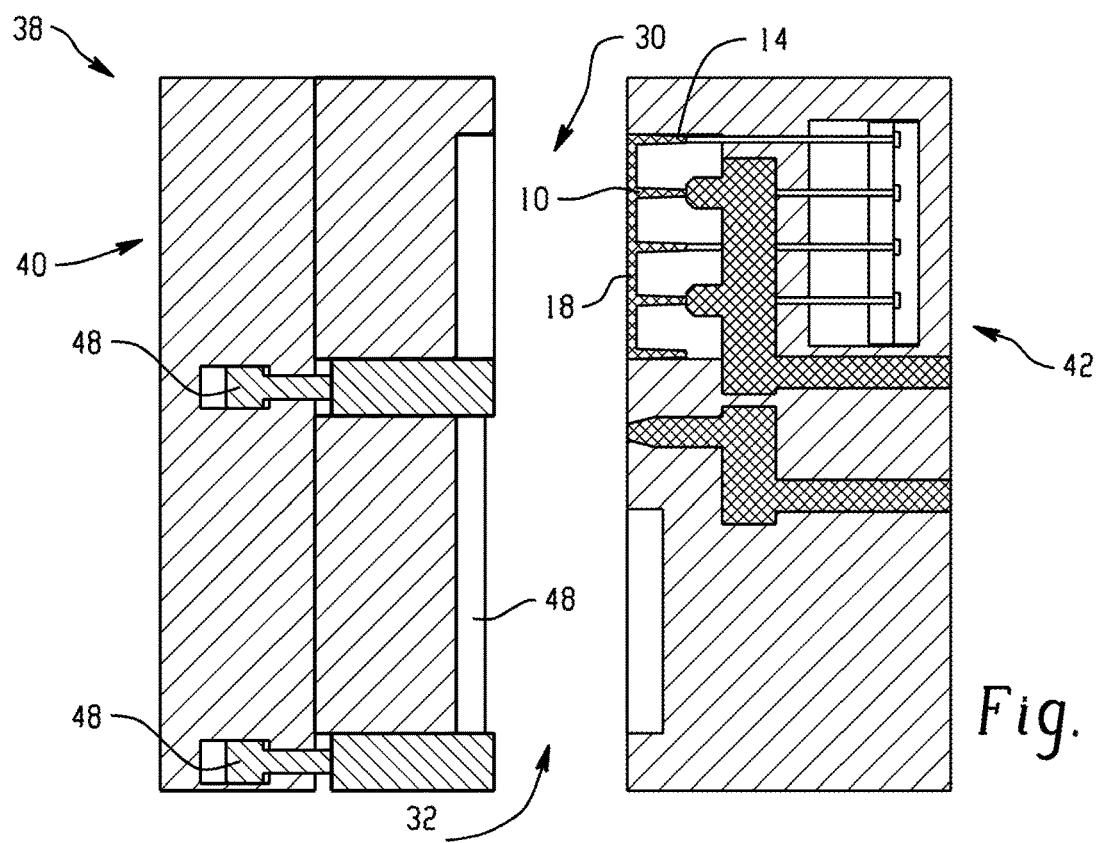
FIG. 11 is an illustration of the mold of FIG. 10 in the open position with a ribbed structure formed in the top cavity.
Figure 12:
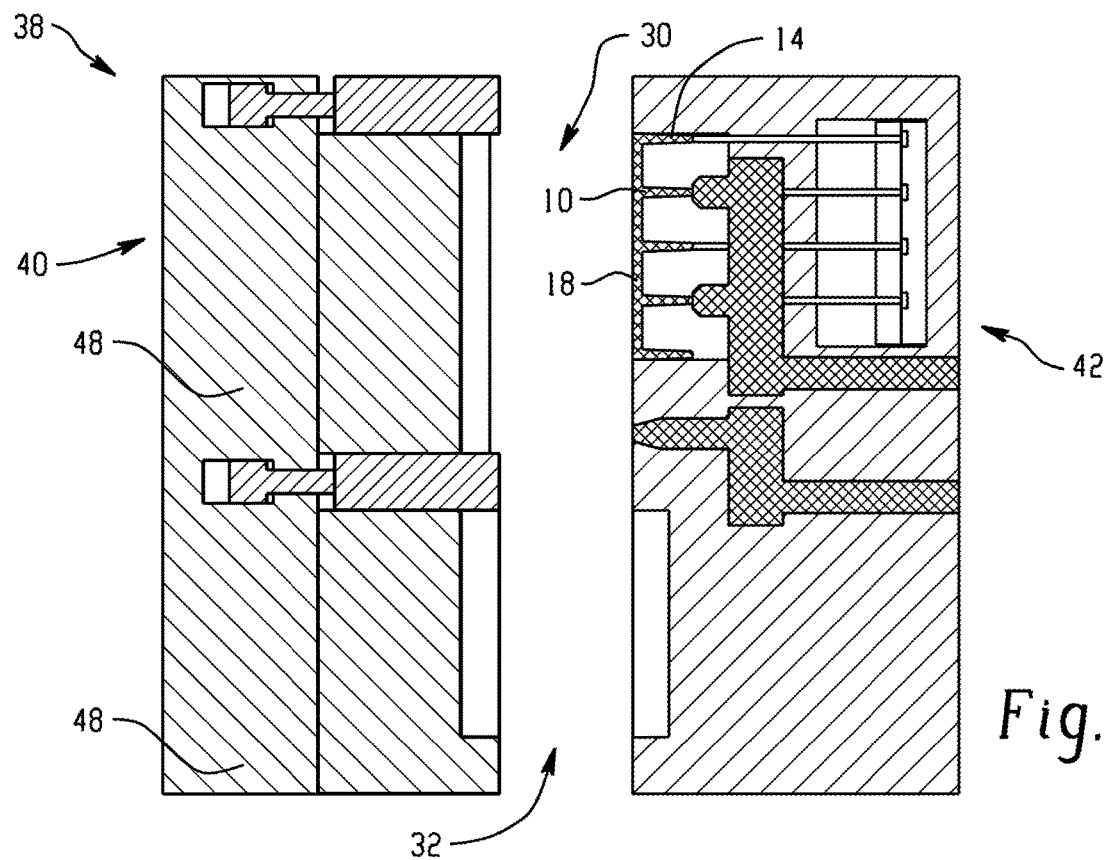
FIG. 12 is an illustration of the mold of FIG. 11 in the open position where the layer mold has been rotated to the top cavity.
Figure 13:
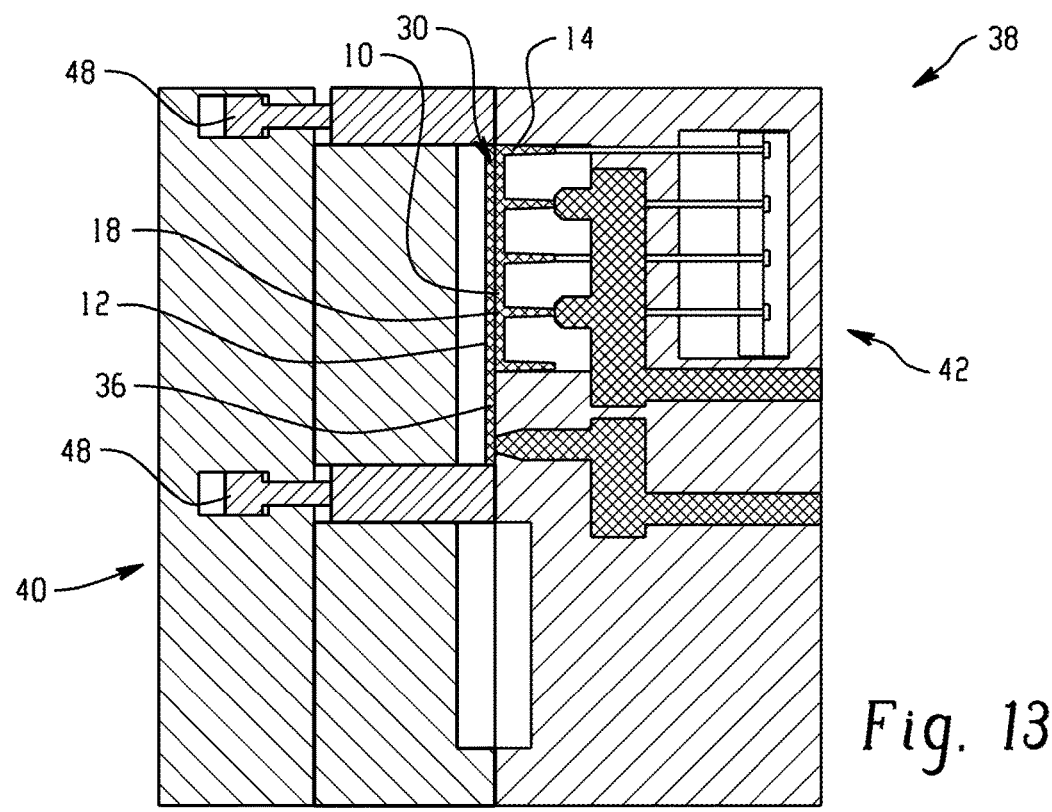
FIG. 13 is an illustration of the mold of FIG. 12 in the closed position where the layer is overmolded to the ribbed structure.

FIGS. 9-13 illustrate a two component molding sequence where the ribbed structure 10 is formed before the layer 12. In FIG. 9, the mold 38 in the open position with a top cavity 30 and a bottom cavity 32. In FIG. 10, the mold 38 is closed and a first thermoplastic polymer 34 is injected into the top cavity 30. The ribbed structure 10 is formed, wherein the ribbed structure 10 includes ribbed structure layer 18 and ribs 14. The mold 38 is then opened and layer mold 39 rotated so that layer 12 can be formed in the top cavity 30 (FIGS. 11 and 12). After closing the mold 38, a second thermoplastic polymer 36 is injected into the top cavity 30 and second layer 12 is overmolded to the ribbed structure 10, e.g., onto a portion of the ribbed structure layer 18 or a rib 14 such that a portion of the ribbed structure 10 intrudes into a portion of the layer 12 (see FIG. 13). Layer 12 can include a Class A surface finish that is not blemished when attached to the ribbed structure 10 due to the two component injection molding process.

The ribbed structure 10 can include the ribbed structure layer 18 and ribs 14. The ribbed structure 10 can include the ribs 14 only. The various components of the parts molded in FIGS. 4-13 have the dimensions previously described herein.

Figure 14:
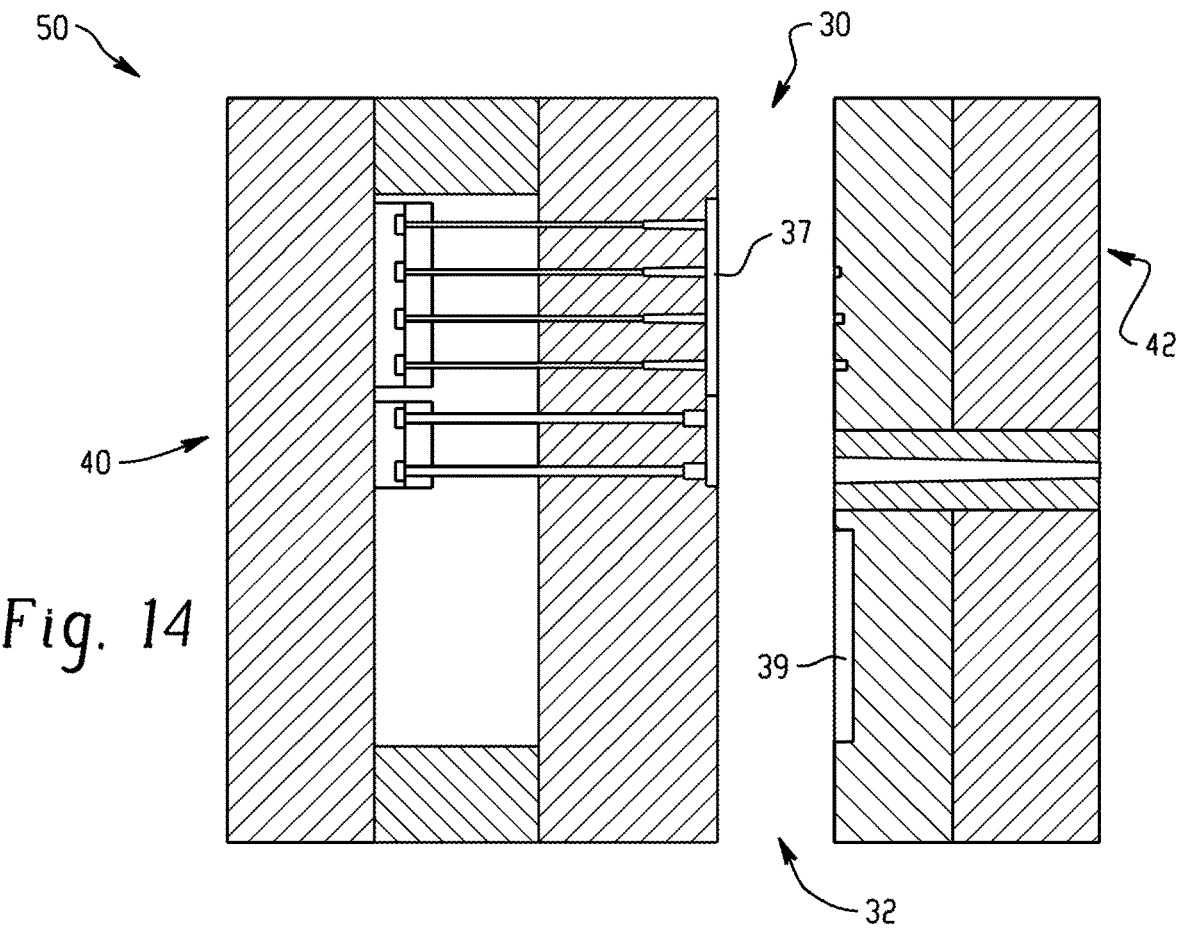
FIG. 14 is an illustration of another mold in an open position with a ribbed structure mold in a top cavity.
Figure 15:
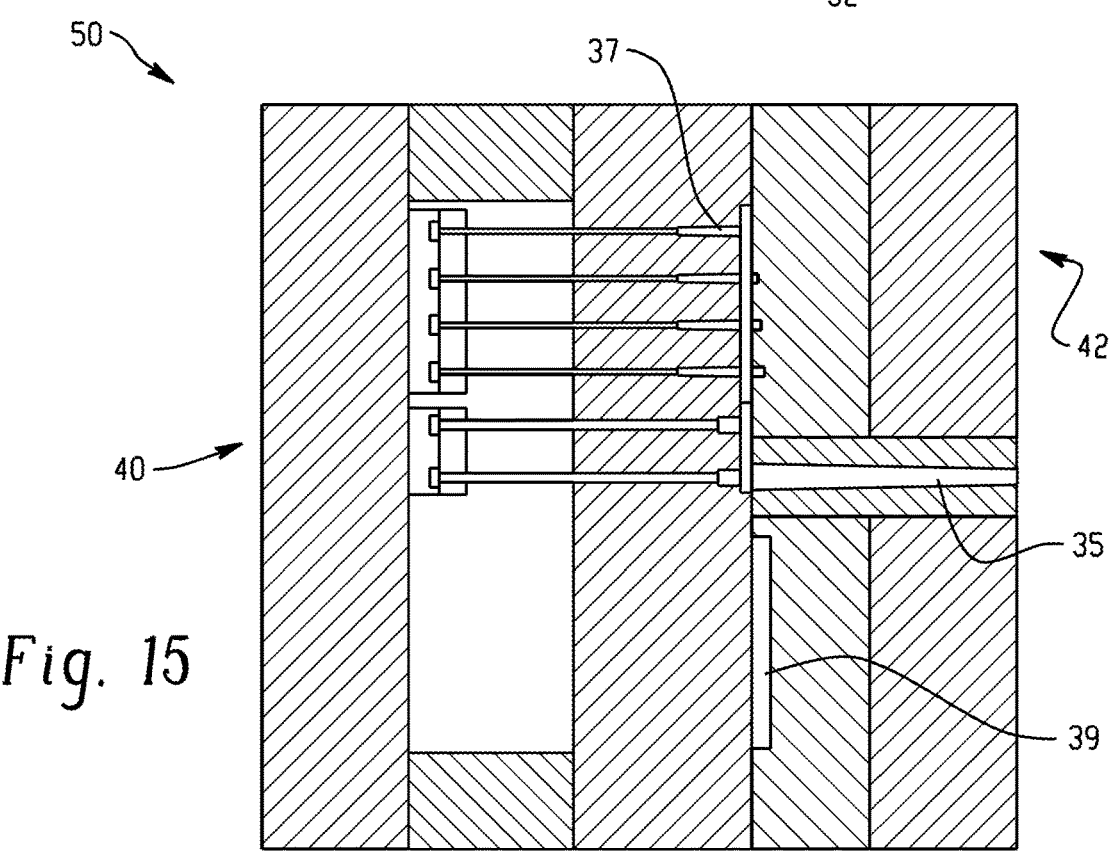
FIG. 15 is an illustration of the mold of FIG. 14 in a closed position.
Figure 16:
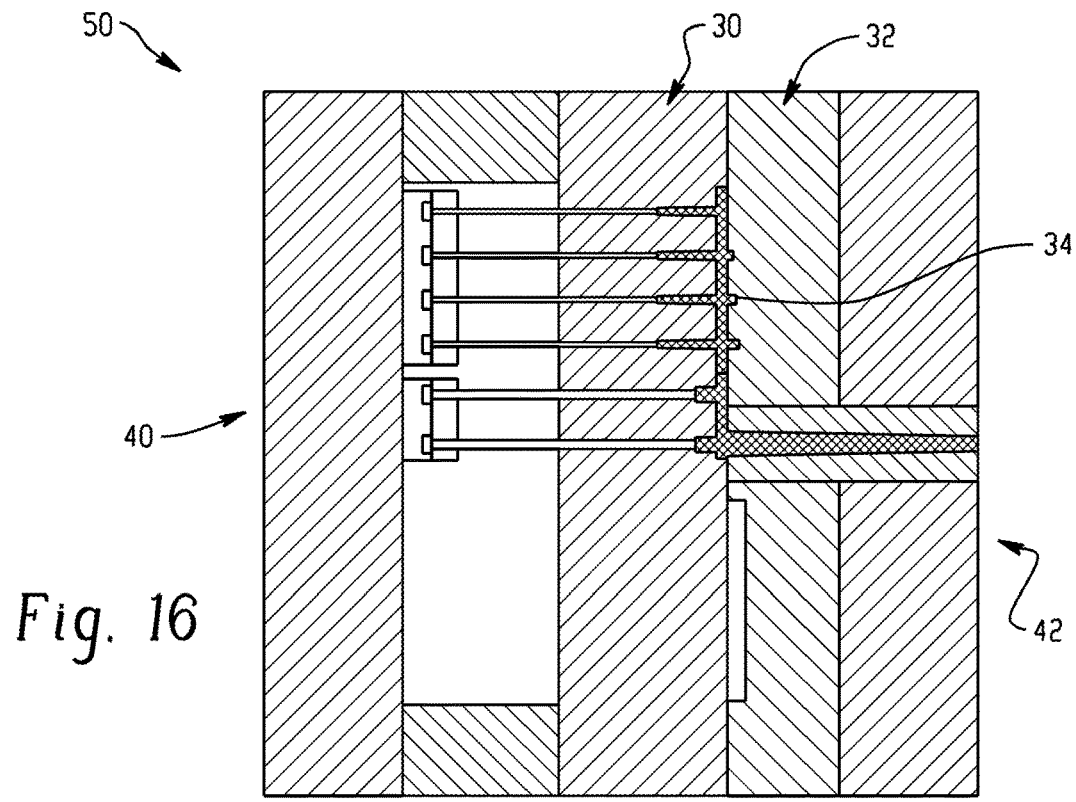
FIG. 16 is an illustration of the mold of FIG. 14 in a closed position where the ribbed structure is being formed in the top cavity.
Figure 17:
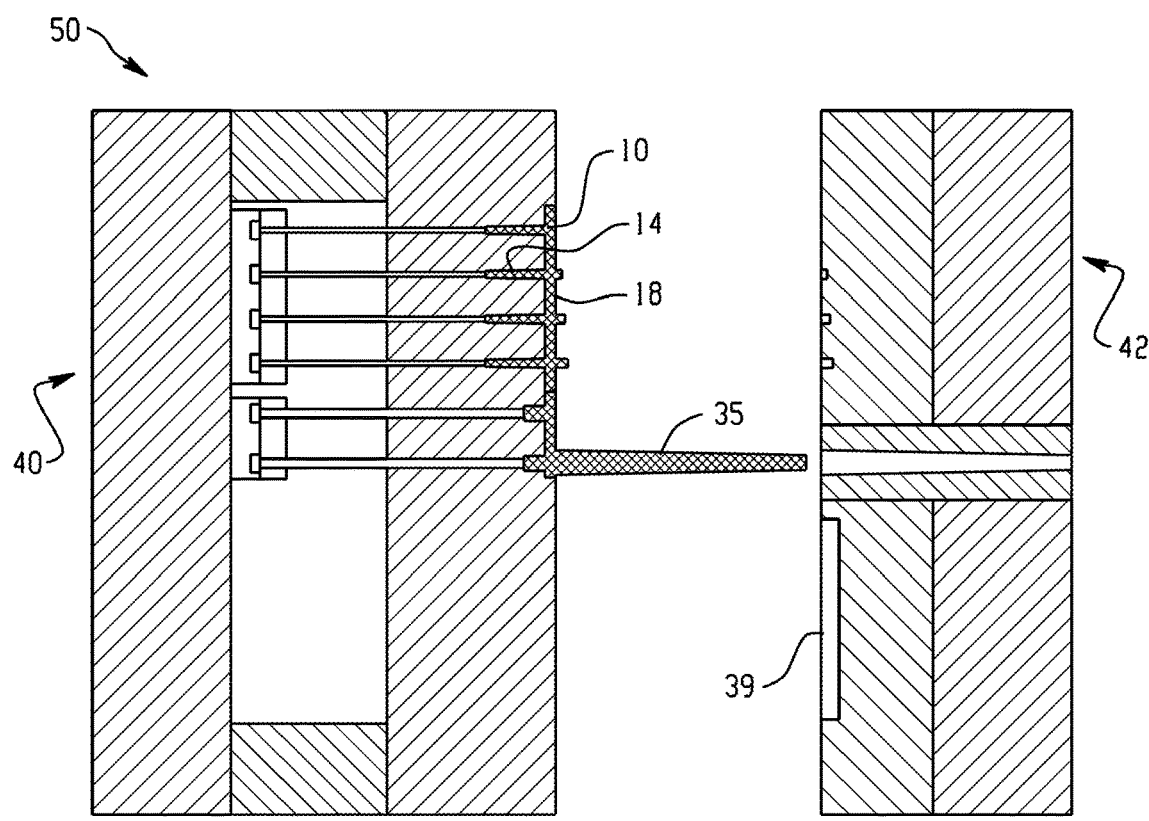
FIG. 17 is an illustration of the formed ribbed structure of FIG. 15 where the runner is still attached to the ribbed structure.
Figure 18:
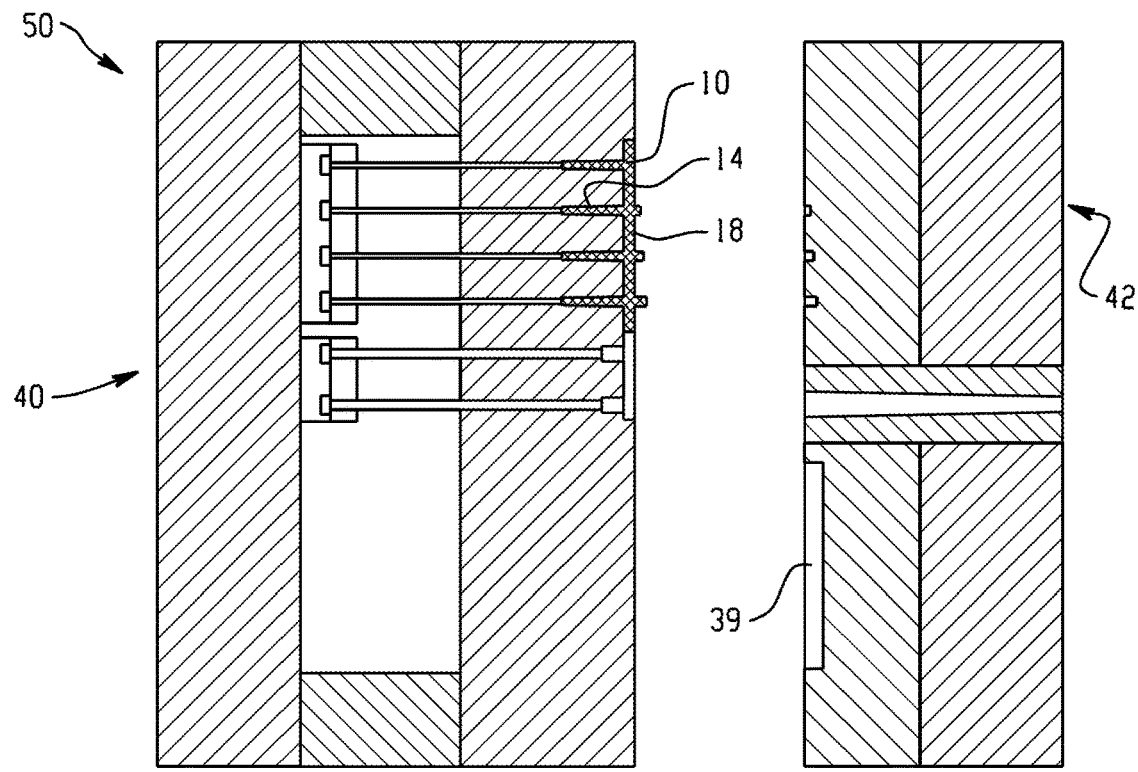
FIG. 18 is an illustration of the formed ribbed structure of FIG. 15 where the runner has been discarded.
Figure 19:
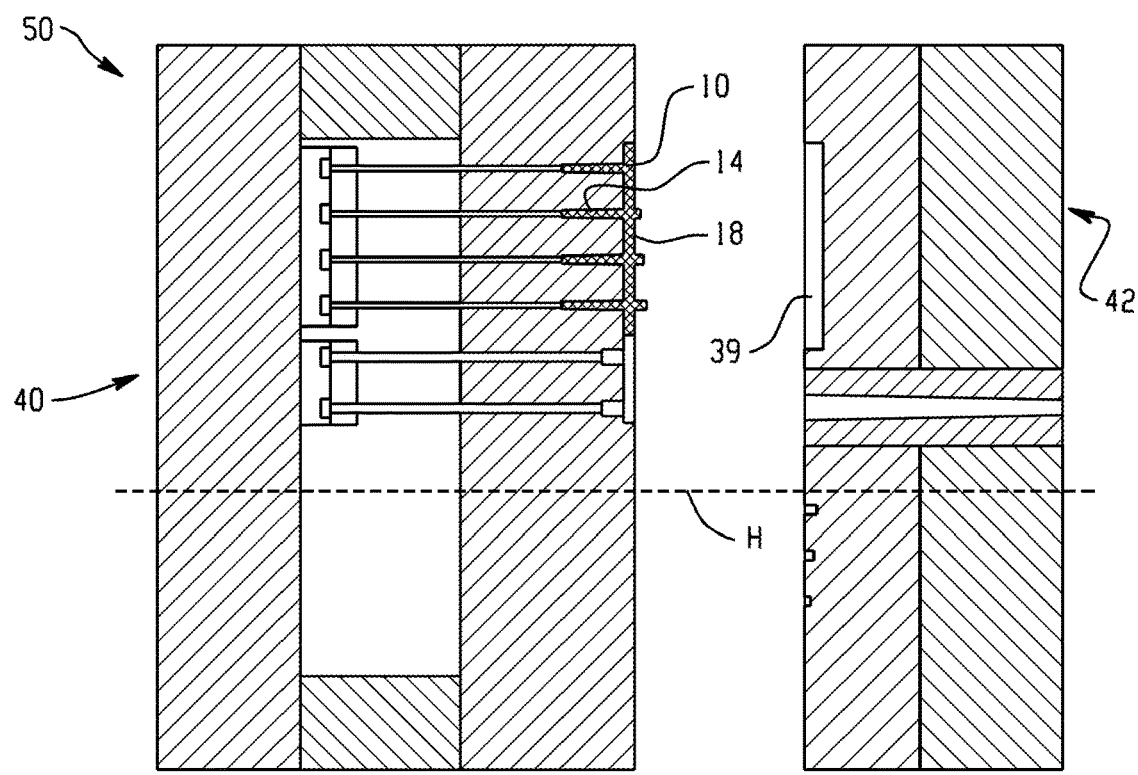
FIG. 19 is an illustration of the mold of FIG. 14 where a layer mold has been rotated from a bottom cavity to the top cavity.
Figure 20:
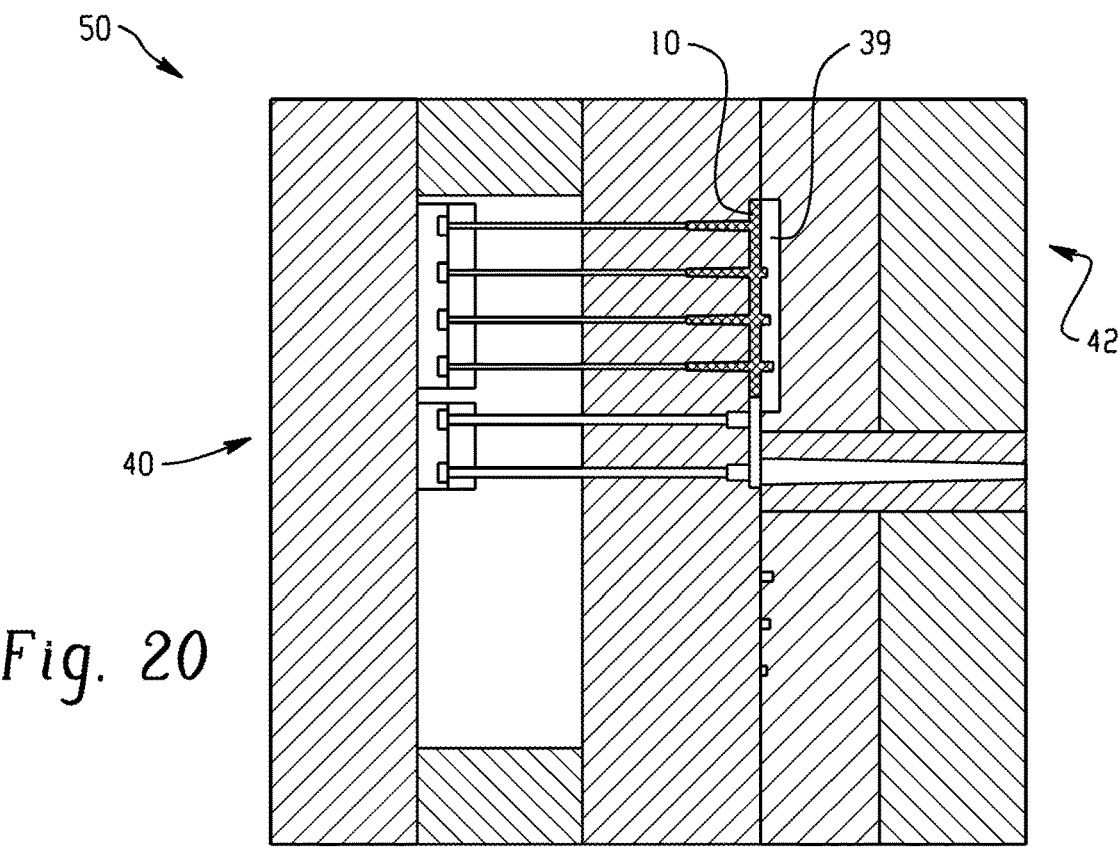
FIG. 20 is an illustration of the mold of FIG. 19 in a closed position.
Figure 21:
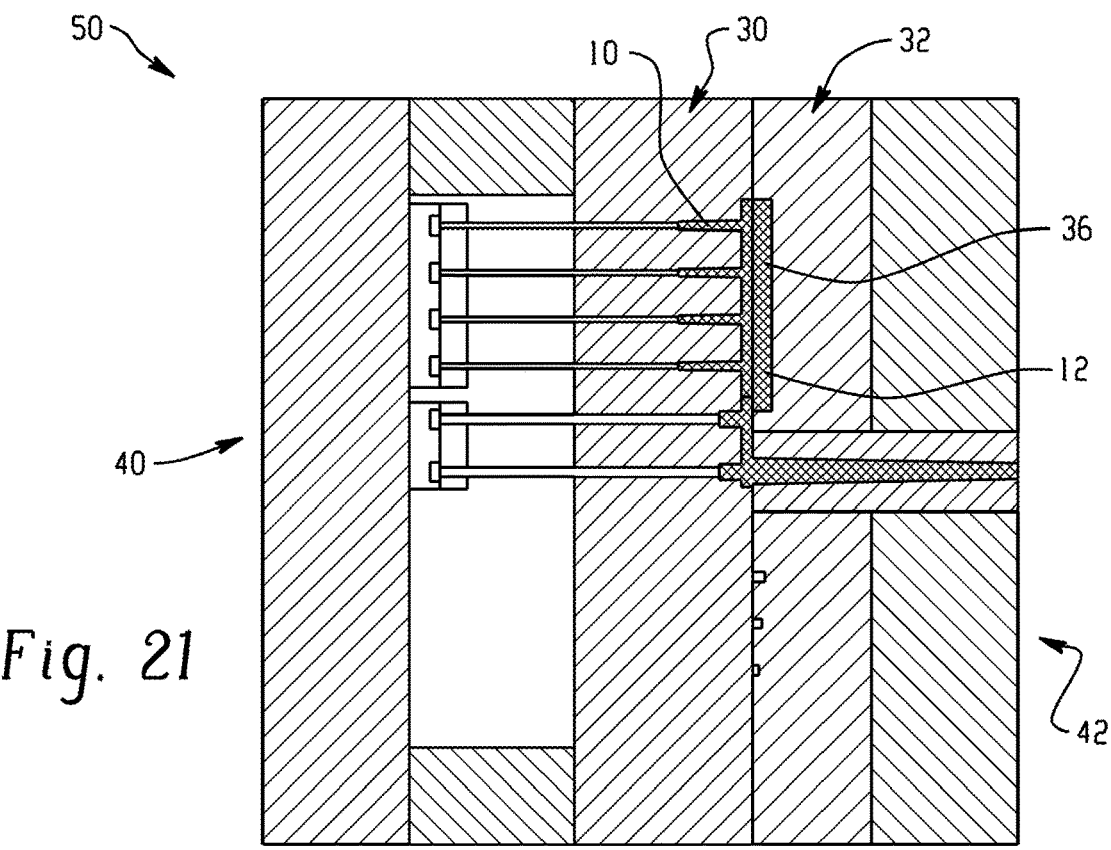
FIG. 21 is an illustration of the mold of FIG. 15 in the closed position where a layer is overmolded to the ribbed structure.
Figure 22:
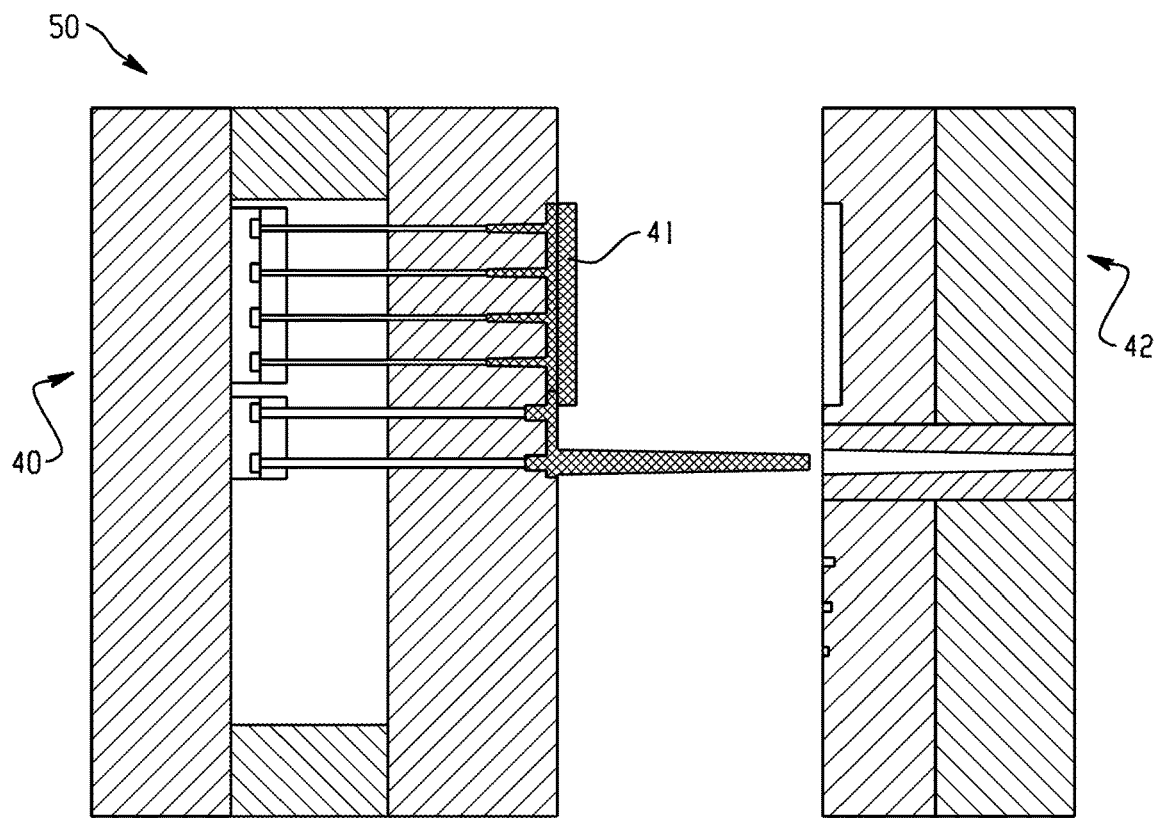
FIG. 22 is an illustration of the mold of FIG. 21 in the open position with the formed part.

FIGS. 14-16 illustrate another embodiment of forming a part with a Class A surface finish and reduced imperfections such as shrinkage or warpage on the part after molding. In FIG. 14, a mold 50 having a top cavity 30 and a bottom cavity 32 is in an open position with a moving half 40 and a stationary half 42 with a ribbed structure mold 37 present in the moving half 40 and a layer mold 39 present in the stationary half 42. In FIG. 15, the mold 50 has been closed. In FIG. 16, a first thermoplastic material 34 has been injected into the top cavity 30 through runner 35 forming a ribbed structure 10 including ribs 14 and ribbed structure layer 18. After the ribbed structure 10 is formed, the mold 50 is opened as illustrated in FIG. 17. The ribbed structure 10 is present on the moving half 40 of the mold. The runner 35 is ejected while the mold 50 is in the open position (see FIG. 18). After the runner 35 has been ejected, the layer mold 39 can be rotated to the top cavity 30 on the stationary half 42 of the mold 50. Movement of layer mold 39 can be effected by movement of the entire mold over its horizontal axis, illustrated by line H in FIG. 19. While the mold 50 is closed as in FIG. 21, the ribbed structure is brought into contact with the layer mold 39. After contact, a second thermoplastic polymer 36 is injected into the layer mold 39 and a layer 12 is overmolded ribbed structure 10 to form a part with a Class A surface finish and reduced surface imperfections (FIG. 21). The finished part 41 can be removed from the mold 50 after the mold 50 has been opened and runner 35 ejected.

Figure 23:
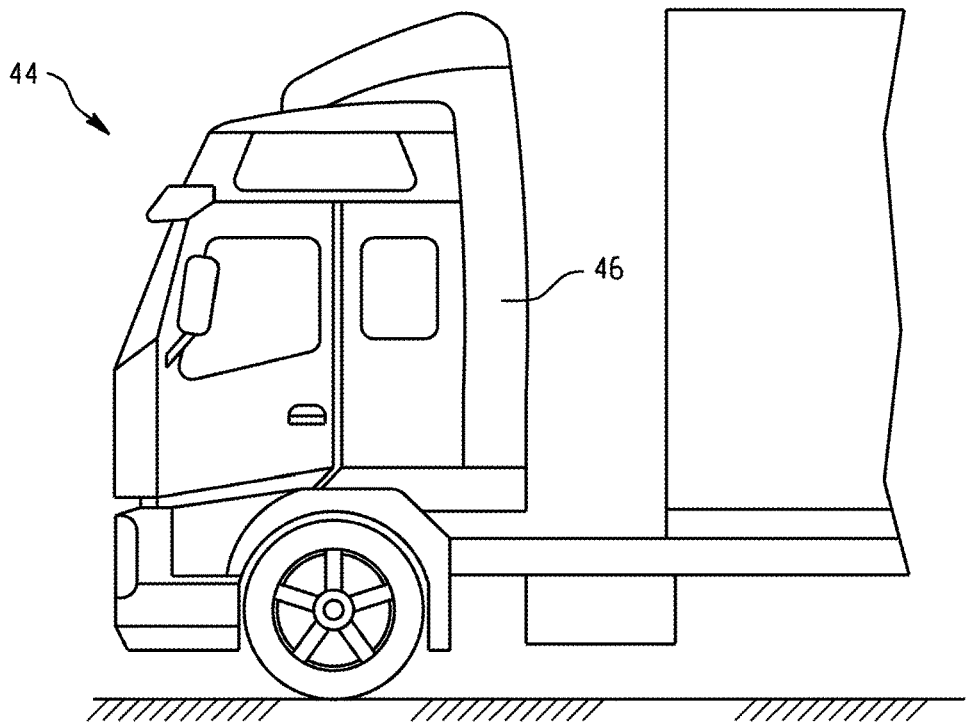
FIG. 23 is an illustration of a vehicle including a vehicular body portion.

Various articles can be formed by the injection molding methods disclosed herein. Applications can include electronic devices (e.g., mobile phones, laptop computers, electronic tablets, e-readers, televisions, computer monitors, touch displays, and the like), automotive components such as vehicular body panels (e.g., engine hoods, roof parts, doors, truck spoilers, etc.), home appliances, refrigerator shelves, medical devices, office furniture, building materials, construction materials, eye wear, face shields, and the like. For example, these articles can be used in housings, bezels, control panels, display panels, windows, covers, trim pieces, support elements, and the like. In an embodiment, the article can form a housing for an electronic device where an electronic component is disposed within the article (e.g., a mobile phone, electronic tablet, e-reader, and the like). In an embodiment, the article can form an automotive interface such as a radio bezel, heat/ventilation/air conditioner bezel (e.g., heating vent bezel, ventilation bezel, air conditioning bezel, or the like), rocker button, instrument cluster, or a combination including at least one of the foregoing. A vehicle 44 and a vehicular body panel 46 are illustrated in FIG. 23.

A method of making a vehicular body panel can include injecting a first thermoplastic polymer into a first cavity; forming a ribbed structure comprising ribs in the first cavity, wherein each rib in the ribbed structure includes a microstructure on an outer portion of a rib; overmolding a layer formed in the second cavity by injecting a second thermoplastic polymer into the second cavity, wherein the overmolding occurs at an interface between the layer and the ribbed structure, wherein during overmolding the two products are bonded (e.g., welded, fused) together, wherein the interface is disposed on an outer portion of a rib including the microstructure, wherein the microstructure remains unfilled with the first thermoplastic polymer or the second thermoplastic polymer; cooling the layer and the ribbed structure; forming a microchannel at the interface between the layer and the microstructure; injecting a gas into the microchannel; enlarging the microchannel with the gas forming an open channel configured to reduce the amount of shrinkage experienced by the vehicular body panel; forming the vehicular body panel; cooling the vehicular body panel with a cooling system; and ejecting the vehicular body panel. The vehicular body panel can have a Class A surface finish.

A method of making a vehicular body panel can include injecting a first thermoplastic polymer into a first cavity; forming a layer in the second cavity; overmolding a ribbed structure comprising ribs formed in the second cavity by injecting a second thermoplastic polymer into the second cavity, wherein the overmolding occurs at an interface between the layer and the ribbed structure, wherein during overmolding the two products are bonded (e.g., welded, fused) together, wherein at each rib connection the layer includes a microstructure; wherein the interface is disposed on a portion of the layer including the microstructure, wherein the microstructure remains unfilled with the first thermoplastic polymer or the second thermoplastic polymer; cooling the ribbed structure and the layer; forming a microchannel at the interface between the layer and the microstructure; injecting a gas into a gas needle; enlarging the microstructure with the gas forming a microchannel configured to reduce the amount of shrinkage experienced by the vehicular body panel; forming the vehicular body panel; cooling the vehicular body panel with a cooling system; and ejecting the vehicular body panel. The vehicular body panel can have a Class A surface finish.

Packing pressuring during filling of the microchannel can be 10 MPa to 1,500 MPa, for example, 25 MPa to 1,000 MPa, for example, 50 MPa to 500 MPa, for example, 100 MPa to 250 MPa.

A rapid temperature-changing injection molding process ("heat and cool") can be used in any of the methods disclosed herein. Use of such a rapid temperature-changing injection molding process can increase melt fluidity in the filling stage of the injection molding cycle and can further improve part quality. The heat and cool process generally includes raising the mold wall temperature above the thermoplastic polymer's glass transition temperature or melting temperature during the filling stage, followed by rapid cooling. Processing benefits can include longer, more uniform holding pressure, even in areas far from the gate, which can lower injection pressure and clamping requirements; improved flow lengths; reduction of internal part stresses; and reduction or elimination of weld lines, jetting, silver streaks, or sink marks. Other benefits can include improved replication of minute mold-surface details and improved part surface finish. For example, such a method can ensure a smooth, resin-rich surface in glass-reinforced parts or prevent visible bubbles or "splay" in foamed parts. Thermal cycling of the mold can eliminate post-mold downstream operations such as sanding, annealing, priming, and painting to hide surface defects.

EXAMPLES

Example 1

Figure 24:
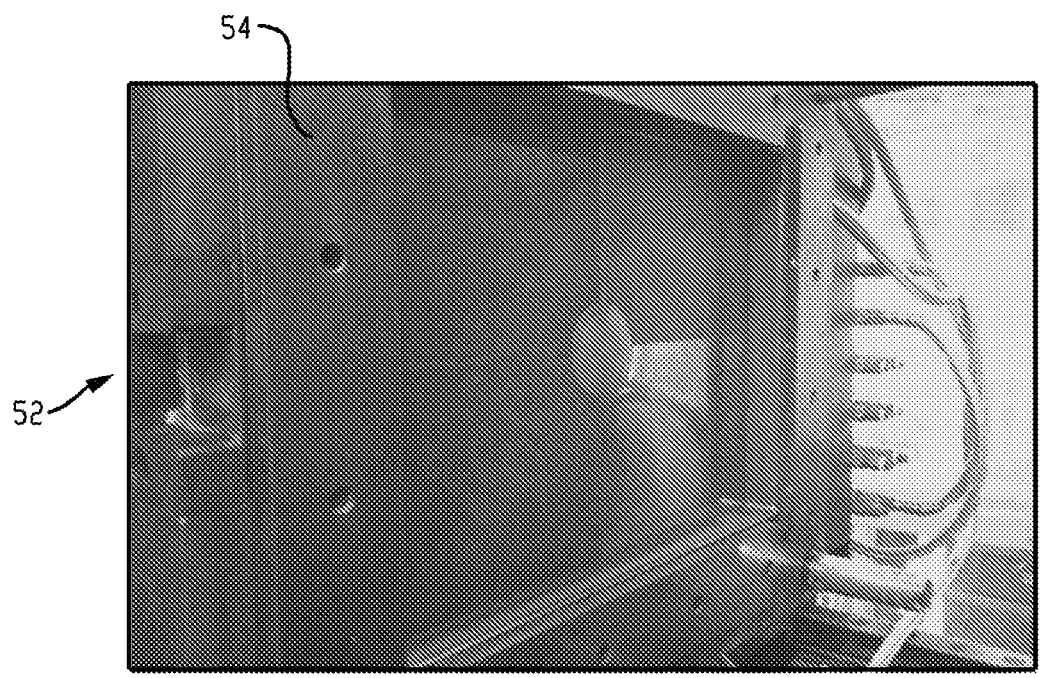
FIG. 24 is an illustration of a center gated front mold with four different surfaces.
Figure 25:
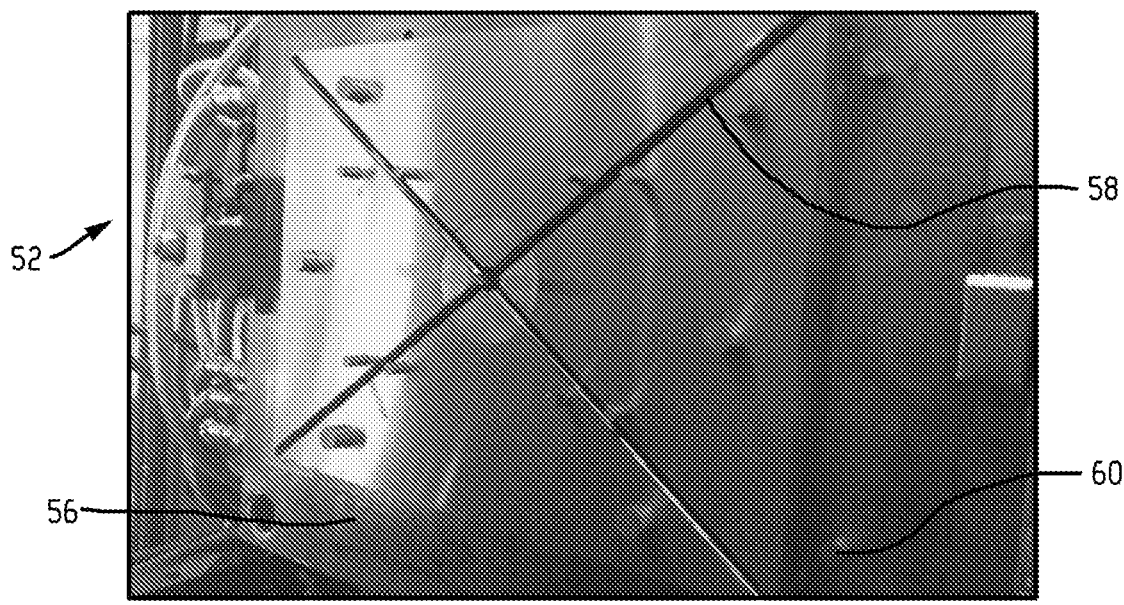
FIG. 25 is an illustration of a back mold including ribs.
Figure 26D:
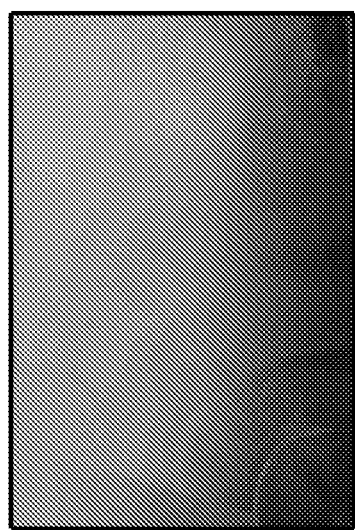
FIG. 26D is an illustration of the sink marks present in a part where a foamed ribbed structure was molded first and a layer was overmolded to the ribbed structure.
Figure 26E:
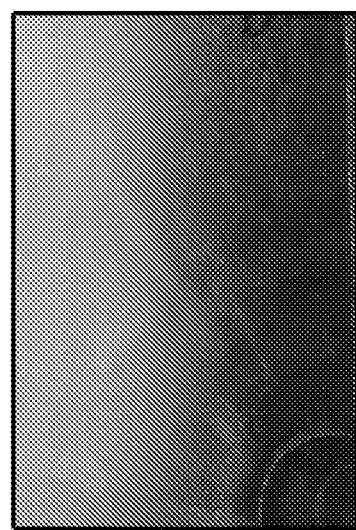
FIG. 26E is an illustration of the sink marks present in a part where an unfoamed ribbed structure was molded first and a layer was overmolded to the ribbed structure.
Figure 26A:
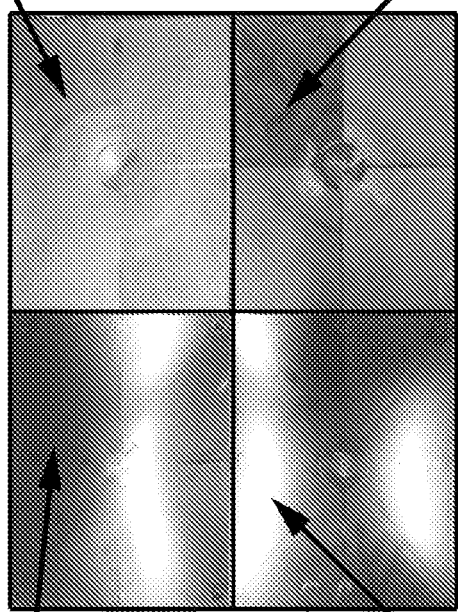
FIG. 26A is an illustration of the effect of foaming and injection sequence on sink mark appearance in a part with ribs.
Figure 26B:
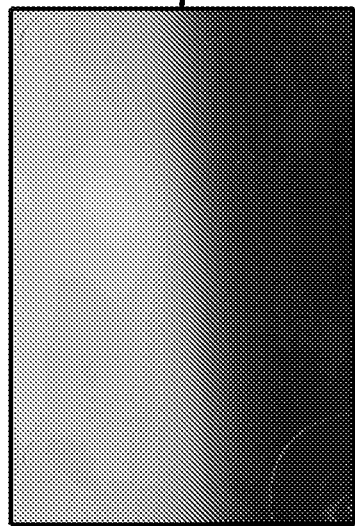
FIG. 26B is an illustration of the sink marks present in a part where a layer was molded first and a foamed ribbed structure was overmolded to the layer.
Figure 26C:
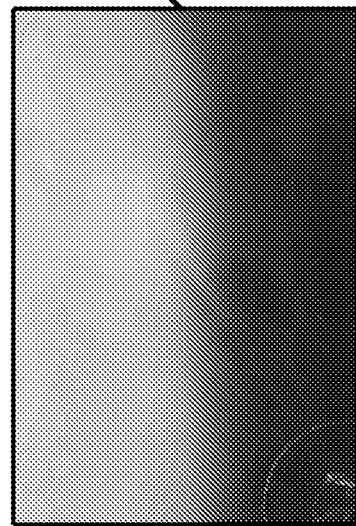
FIG. 26C is an illustration of the sink marks present in a part where a layer was molded first and an unfoamed ribbed structure was overmolded to the layer.

In this example, a mold 52 as shown in FIGS. 24 and 25 was used to test gas assisted injection molding processes with the rib molding as described with respect to FIG. 1D. FIG. 24 illustrates a back mold 54 with 4 sections and FIG. 25 illustrates a front mold 56 with cross-ribs 58 and expulsion pens 60. A polycarbonate/acrylonitrile butadiene styrene thermoplastic blend (CYCOLOY™ XCM830, commercially available from SABIC's Innovative Plastics business) was used to mold the plaques. The mold 52 was center gated with the cross-ribs 58 measuring 3 mm wide by 20 mm deep. The 4 sections of the back mold 54 included 3 textured surfaces and one non-textured surface. FIGS. 26A-26B illustrate the results from molding with mold 52. FIG. 26A illustrates the effect of foaming and the injection sequences on sink mark appearance in a part with ribs for each of FIG. 26B-26E with plaques of each sample. In FIGS. 26B (Sample 1) and 26C (Sample 2), a layer was molded first and a ribbed structure was overmolded to the layer after the layer solidified and cooled. In FIG. 26B, a foamed rib structure as described in FIGS. 3A-3D was used. In FIG. 26C, an unfoamed rib structure was used. In FIGS. 26D (Sample 3) and 26E (Sample 4), a ribbed structure was first formed and a layer was overmolded to the ribbed structure after the ribbed structure solidified and cooled. In FIG. 26D, a foamed rib structure was used. In FIG. 26C, an unfoamed rib structure was used. As can be seen, the sink marks were most clearly visible in FIG. 26C where the layer was first molded and then overmolded with the unfoamed ribbed structure. A slight improvement was seen in FIG. 26B, when a foamed ribbed structure was used. By switching the injection sequence and first molding the ribbed structure and then the layer, an improvement can be seen as illustrated by both FIGS. 26D and 26E.

Example 2

In this example, a mold and molding process such as that described with respect to FIGS. 14-22 was used and defect visualization tests conducted. Table 1 lists the material compositions and reflection results for Samples 5-8. All polymers used are commercially available from SABIC's Innovative Plastics business. Rib intrusion into the layer varied from 0 mm to 3 mm for each sample.

TABLE 1

Material Compositions

| Sample No. | Polymer Description | Grade |
|---|---|---|
| 5 | PC/PBT | XENOY ™ CL100 |
| 6 | PC/PET | XENOY ™X2500UV |
| 7 | PC/PBT | XENOY ™ X5100 |
| 8 | PC/PBT with 12% mineral filler | XENOY ™ X4850 |

Figure 27A:
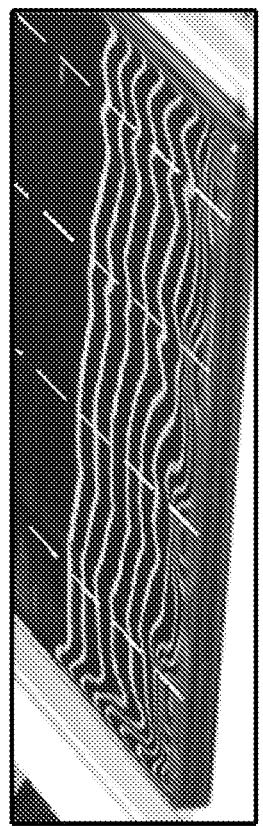
FIGS. 27A-27D are illustrations of the sink marks present in Sample 5.
Figure 27C:
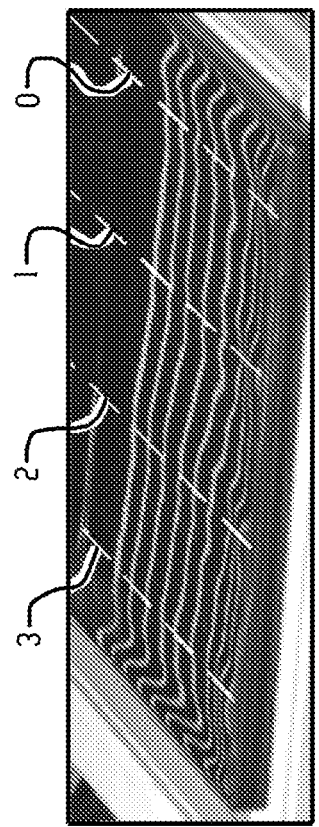
Figure 27B:
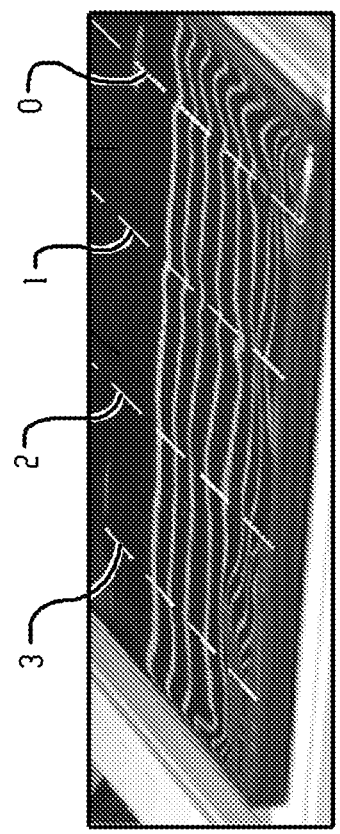
Figure 27D:
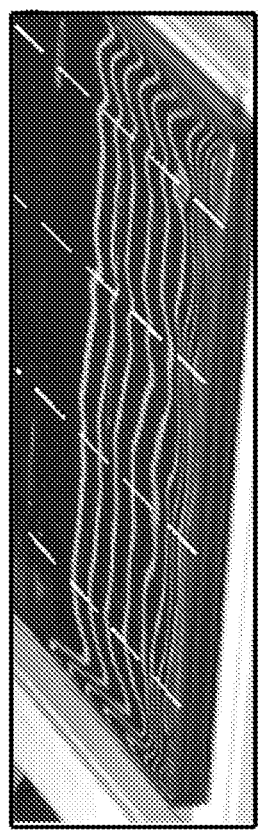

FIGS. 27A to 27D illustrate defect visualization of Sample 5. FIG. 27A was conducted at a packing pressure of 30 MPa and a mold temperature of 80° C.; FIG. 27B was conducted at a packing pressure of 30 MPa and a mold temperature of 60° C.; FIG. 27C was conducted at a packing pressure of 50 MPa and a mold temperature of 80° C.; FIG. 27D was conducted at a packing pressure of 50 MPa and a mold temperature of 60° C. Rib intrusion varied across the part, starting at 0 mm at the right most portion and ending at 3 mm as illustrated in FIG. 27A.

Figure 28C:
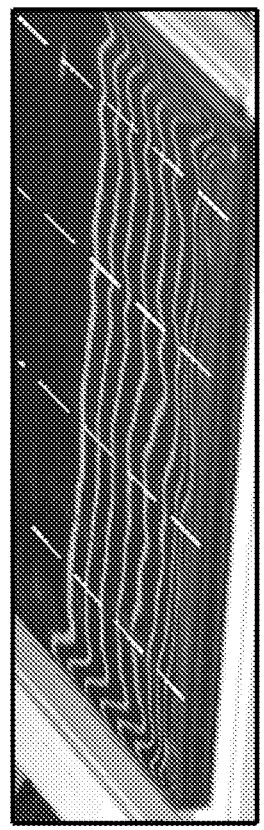
FIGS. 28A-28D are illustrations of the sink marks present in Sample 6.
Figure 28D:
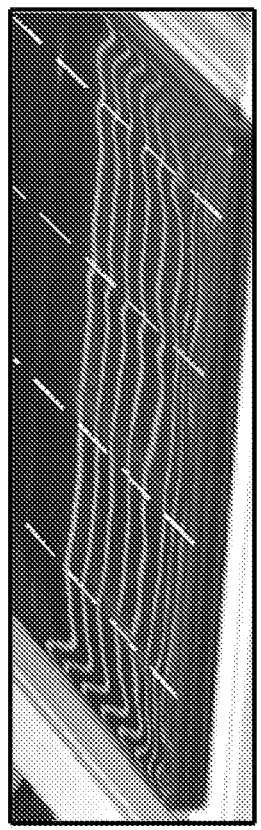
Figure 28A:
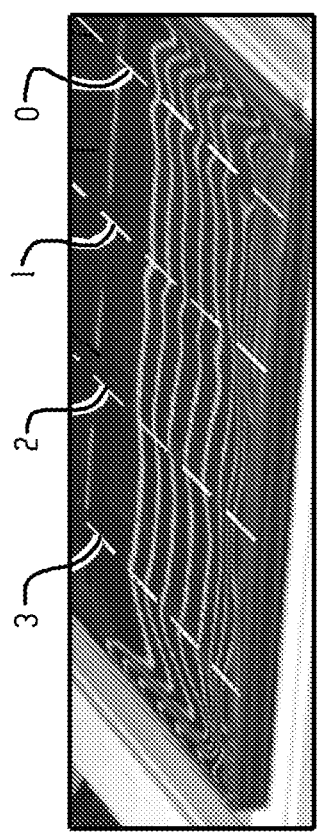
Figure 28B:
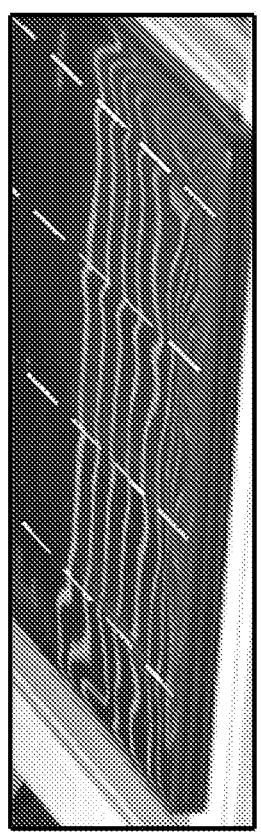

FIGS. 28A to 28D illustrate defect visualization of Sample 6. FIG. 28A was conducted at a packing pressure of 30 MPa and a mold temperature of 80° C.; FIG. 28B was conducted at a packing pressure of 30 MPa and a mold temperature of 60° C.; FIG. 28C was conducted at a packing pressure of 50 MPa and a mold temperature of 80° C.; FIG. 28D was conducted at a packing pressure of 50 MPa and a mold temperature of 60° C. Rib intrusion varied across the part, starting at 0 mm at the right most portion and ending at 3 mm as illustrated in FIG. 28A.

Figure 29A:
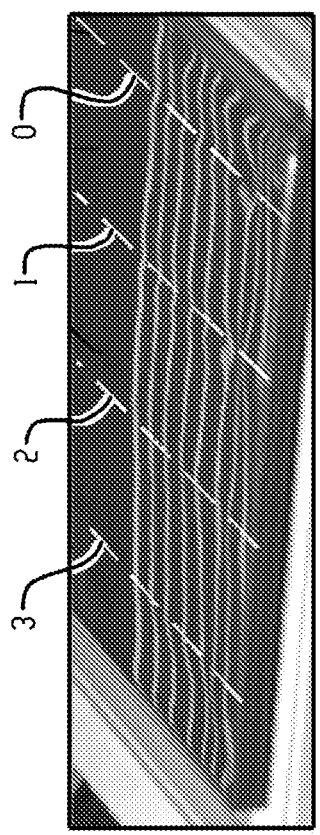
FIGS. 29A-29D are illustrations of the sink marks present in Sample 7.
Figure 29C:
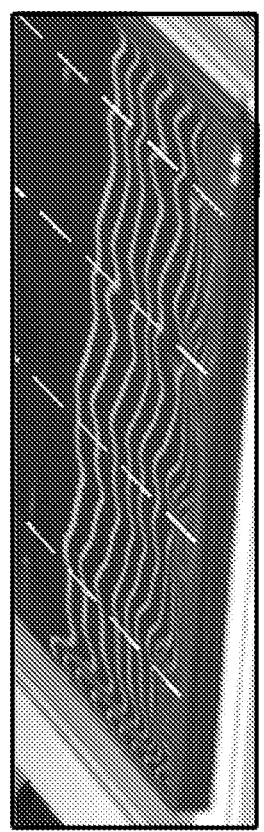
Figure 29B:
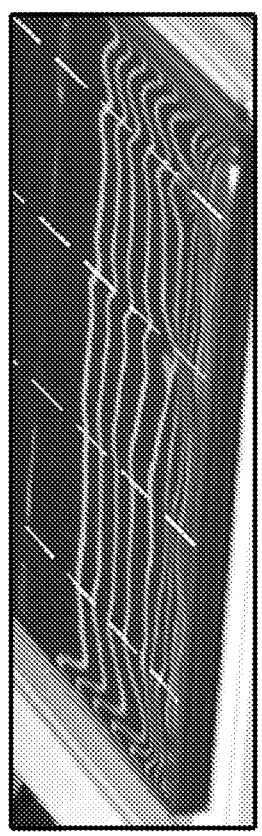
Figure 29D:
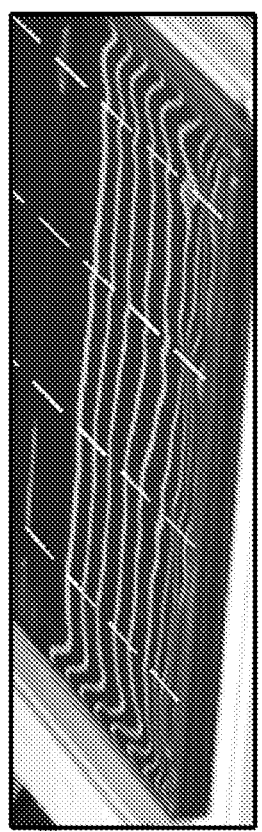

FIGS. 29A to 29D illustrate defect visualization of Sample 7. FIG. 29A was conducted at a packing pressure of 30 MPa and a mold temperature of 80° C.; FIG. 29B was conducted at a packing pressure of 30 MPa and a mold temperature of 60° C.; FIG. 29C was conducted at a packing pressure of 50 MPa and a mold temperature of 80° C.; FIG. 29D was conducted at a packing pressure of 50 MPa and a mold temperature of 60° C. Rib intrusion varied across the part, starting at 0 mm at the right most portion and ending at 3 mm as illustrated in FIG. 29A.

Figure 30A:
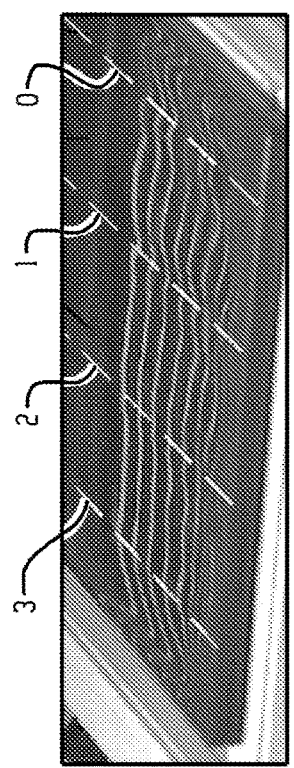
FIGS. 30A-30D are illustrations of the sink marks present in Sample 8.
Figure 30B:
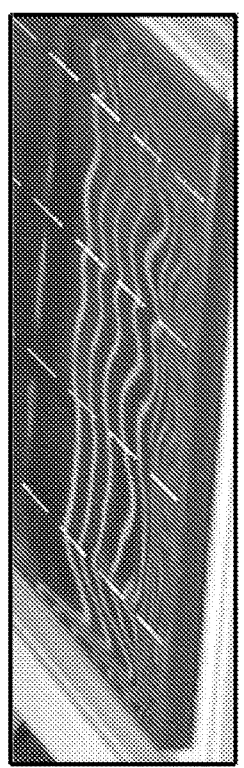
Figure 30C:
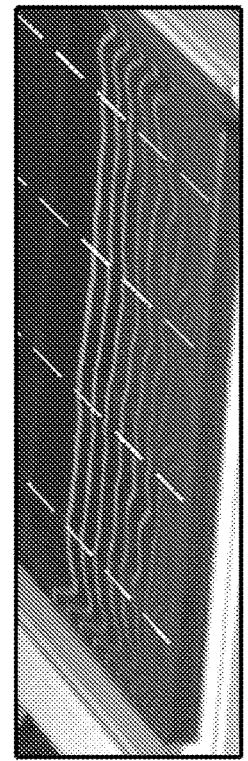
Figure 30D:
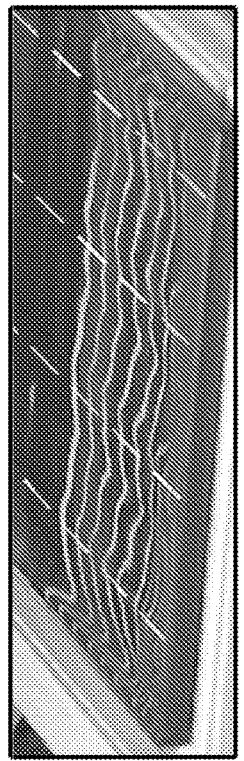

FIGS. 30A to 30D illustrate defect visualization of Sample 8. FIG. 30A was conducted at a packing pressure of 30 MPa and a mold temperature of 80° C.; FIG. 30B was conducted at a packing pressure of 30 MPa and a mold temperature of 60° C.; FIG. 30C was conducted at a packing pressure of 50 MPa and a mold temperature of 80° C.; FIG. 30D was conducted at a packing pressure of 50 MPa and a mold temperature of 60° C. Rib intrusion varied across the part, starting at 0 mm at the right most portion and ending at 3 mm as illustrated in FIG. 30A.

Sample 5 at 60° C. and 50 MPa, Sample 6 at 80° C. and 50 MPa, Sample 7 at 80° C. and 30 MPa, and Sample 10 at 80° C. and 50 MPa demonstrated the best results from all the tests conducted with the lowest amount of surface imperfections, i.e., sink marks present. As can be seen from these samples, on average some defects were observed at intrusion of 0 mm and 1 mm whereas virtually no defects were observed at 2 mm and 3 mm intrusion. Rather at 2 mm and 3 mm, minuscule bumps can be observed sometimes, which indicate a protrusion, not a sink mark.

The methods and articles disclosed herein include at least the following embodiments:

Embodiment 1

A method of reducing surface imperfections in an injection molded part, comprising: injecting a first thermoplastic polymer into a first cavity; forming a ribbed structure comprising ribs in the first cavity, wherein each rib in the ribbed structure includes a microstructure on an outer portion of a rib; and reducing the surface imperfections in the part by overmolding a layer formed in the second cavity onto a portion of a rib by injecting a second thermoplastic polymer into the second cavity, wherein the overmolding occurs at an interface between the layer and the ribbed structure; or injecting a first thermoplastic polymer into a first cavity; forming a layer in the first cavity; and reducing the surface imperfections in the part by overmolding a ribbed structure comprising ribs formed in the second cavity onto a portion of the layer formed in the first cavity; wherein the part has a Class A surface finish.

Embodiment 2

A method of reducing surface imperfections in an injection molded part, comprising: injecting a first thermoplastic polymer into a first cavity; forming a ribbed structure comprising ribs in the first cavity, wherein each rib in the ribbed structure includes a microstructure on an outer portion of a rib; overmolding a layer formed in a second cavity by injecting a second thermoplastic polymer into the second cavity at an interface between the layer and the ribbed structure, wherein the interface is disposed on an outer portion of a rib including the microstructure, wherein the microstructure of the ribbed structure remains unfilled with the first thermoplastic polymer or the second thermoplastic polymer; or injecting a first thermoplastic polymer into a first cavity; forming a layer in the first cavity, wherein the layer includes a microstructure; and overmolding a ribbed structure comprising ribs formed in a second cavity by injecting a second thermoplastic polymer into the second cavity, wherein the overmolding occurs at an interface between the layer and the ribbed structure, wherein the interface is disposed on an outer portion of the layer including the microstructure, wherein the microstructure of the layer remains unfilled with the first thermoplastic polymer or the second thermoplastic polymer; forming a microchannel at the interface between the layer and the microstructure or at the interface between the ribbed structure and microstructure; injecting a gas into the microchannel; and enlarging the microchannel with the gas forming an open channel to reduce the amount of shrinkage experienced by the part.

Embodiment 3

A method of reducing surface imperfections in an injection molded part, comprising: mixing a foaming agent with a first thermoplastic polymer; melting the thermoplastic polymer to form a melt including the foaming agent; injecting the melt into a first cavity; nucleating bubbles in the melt to produce cells; forming a ribbed structure including an outer layer and ribs disposed on the outer layer in the first cavity, wherein the ribbed structure comprises an expanded layer; injecting a second thermoplastic polymer into a second cavity; and reducing the surface imperfections in the part by overmolding a second layer formed in a second cavity by injecting a second thermoplastic polymer into the second cavity, wherein the overmolding occurs adjacent to the outer layer of the ribbed structure.

Embodiment 4

A method of reducing surface imperfections in an injection molded part, comprising: melting a first thermoplastic polymer to form a melt in a barrel of an injection molding machine; injecting a foaming agent into the barrel; mixing the melt and the foaming agent; injecting the melted thermoplastic polymer and the foaming agent into a first cavity; forming a ribbed structure including an outer layer and ribs disposed on the outer layer in the first cavity, wherein the ribbed structure comprises an expanded, foamed structure throughout the layer and the ribs; and overmolding a second layer formed in a second cavity by injecting a second thermoplastic polymer into the second cavity, wherein the overmolding occurs adjacent to the outer layer of the ribbed structure, wherein the part has a Class A surface finish.

Embodiment 5

The method of Embodiment 3 or Embodiment 4, wherein the foaming agent is at least one of carbon dioxide, sodium bicarbonate, azide compounds, ammonium carbonate, ammonium nitrite, monosodium citrate, light metals which evolve hydrogen upon reaction with water, chlorinated hydrocarbons, chlorofluorocarbons, azodicarbonamide, N,N'dinitrosopentamethylenetetramine, trichloromonofluoromethane, trichlorotrifluoroethane, methylene chloride, organic carboxylic acids, pentane, butane, ethanol, acetone, nitrogen gas ($N_2$), and ammonia gas.

Embodiment 6

The method of any of the preceding embodiments, wherein the ribs intrude into a portion of the layer creating an overlap between the ribbed structure and the layer or between the layer and the ribbed structure.

Embodiment 7

The method of any of the preceding embodiments, wherein a depth of the overlap between the ribbed structure and the layer or between the layer and the ribbed structure at the respective overmolded portions is greater than or equal to 0.1 millimeter.

Embodiment 8

The method of any of the preceding embodiments, wherein the first thermoplastic polymer and the second thermoplastic polymer comprise a different polymer or wherein the first thermoplastic polymer and the second thermoplastic polymer comprise the same polymer.

Embodiment 9

The method of any of the preceding embodiments, wherein the first thermoplastic polymer or the second thermoplastic polymer comprises polybutylene terephthalate, acrylonitrile-butadiene-styrene, polycarbonate, polyethylene terephthalate, acrylic-styrene-acrylonitrile, acrylonitrile-(ethylene-polypropylene diamine modified)-styrene, phenylene ether resins, polyamides, phenylene sulfide resins, polyvinyl chloride, high impact polystyrene, polyolefins, polyimide, polypropylene, or a combination comprising at least one of the foregoing.

Embodiment 10

The method of any of the preceding embodiments, wherein a diameter of each rib is greater than or equal to 1.5 millimeters.

Embodiment 11

The method of any of the preceding embodiments, wherein a thickness of the layer is 0.5 millimeters to 50 millimeters.

Embodiment 12

The method of any of the preceding embodiments, wherein a length of each rib is 5 millimeters to 100 millimeters.

Embodiment 13

The method of any of the preceding embodiments, wherein a draft angle of each rib along a length of the rib is less than or equal to 50°.

Embodiment 14

The method of any of Embodiments 1, 2, and 5-13, wherein the microstructure comprises a triangular cross-section.

Embodiment 15

The method of any of the preceding embodiments, wherein a temperature of the first cavity is greater than the glass transition temperature of the first thermoplastic polymer and wherein the temperature of the second cavity is greater than the glass transition temperature of the second thermoplastic polymer or wherein a temperature of the bottom cavity is greater than the glass transition temperature of the first thermoplastic polymer and wherein the temperature of the top cavity is greater than the glass transition temperature of the second thermoplastic polymer.

Embodiment 16

The method of any Embodiments 1, 2, and 5-15, wherein a packing pressure of the first cavity or the second cavity is 25 MegaPascals to 1,000 MegaPascals.

Embodiment 17

The method of any of the preceding embodiments, wherein warpage of the injection molded part is reduced as compared to an injection molded part made by a different process.

Embodiment 18

The method of any of the preceding embodiments, further comprising using a rapid temperature-changing injection molding process.

Embodiment 19

An article formed by the method of any of the preceding embodiments.

Embodiment 20

The article of Embodiment 19, wherein the article includes a vehicular body panel In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of reducing surface imperfections in an injection molded part, comprising:
    injecting a first thermoplastic polymer into a first cavity;
    forming a ribbed structure comprising ribs in the first cavity, wherein each rib in the ribbed structure includes a microstructure on an outer portion of a rib; and
    reducing the surface imperfections in the part by overmolding a layer formed in a second cavity onto a portion of a rib by injecting a second thermoplastic polymer into the second cavity, wherein the overmolding occurs at an interface between the layer and the ribbed structure,
    wherein the interface is disposed on an outer portion of a rib including the microstructure, wherein the microstructure of the ribbed structure remains unfilled with the first thermoplastic polymer or the second thermoplastic polymer;
    wherein the part has a Class A surface finish.

2. The method of claim 1, wherein the ribs intrude into a portion of the layer creating an overlap between the ribbed structure and the layer or between the layer and the ribbed structure.

3. The method of claim 1, wherein a depth of the overlap between the ribbed structure and the layer or between the layer and the ribbed structure at the respective overmolded portions is greater than or equal to 0.1 millimeter.

4. The method of claim 1, wherein the first thermoplastic polymer and the second thermoplastic polymer comprise a different polymer.

5. The method of claim 1, wherein the first thermoplastic polymer or the second thermoplastic polymer comprises polybutylene terephthalate, acrylonitrile-butadiene-styrene, polycarbonate, polyethylene terephthalate, acrylic-styrene-acrylonitrile, acrylonitrile-(ethylene-polypropylene diamine modified)-styrene, phenylene ether resins, polyamides, phenylene sulfide resins, polyvinyl chloride, high impact polystyrene, polyolefins, polyimide, polypropylene, or a combination comprising at least one of the foregoing.

6. The method of claim 1, wherein a diameter of each rib is greater than or equal to 1.5 millimeters.

7. The method of claim 1, wherein a thickness of the layer is 0.5 millimeters to 50 millimeters.

8. The method of claim 1, wherein a length of each rib is 5 millimeters to 100 millimeters.

9. The method of claim 1, wherein a draft angle of each rib along a length of the rib is less than or equal to 5°.

10. The method of claim 1, wherein the microstructure comprises a triangular cross-section.

11. The method of claim 1, wherein a temperature of the first cavity is greater than the glass transition temperature of the first thermoplastic polymer and wherein the temperature of the second cavity is greater than the glass transition temperature of the second thermoplastic polymer or wherein a temperature of the bottom cavity is greater than the glass transition temperature of the first thermoplastic polymer and wherein the temperature of the top cavity is greater than the glass transition temperature of the second thermoplastic polymer.

12. The method of claim 1, wherein a packing pressure of the first cavity or the second cavity is 25 MegaPascals to 1,000 MegaPascals.

13. The method of claim 1, wherein warpage of the injection molded part is reduced as compared to an injection molded part made by a different process.

14. The method of claim 1, further comprising:
    forming a microchannel at the interface between the layer and the microstructure;
    injecting a gas into the microchannel; and
    enlarging the microchannel with the gas forming an open channel to reduce the amount of shrinkage experienced by the part.

15. The method of claim 1, wherein the thermoplastic polymer comprises a foaming agent.

16. The method of claim 15, wherein the foaming agent is at least one of carbon dioxide, sodium bicarbonate, azide compounds, ammonium carbonate, ammonium nitrite, monosodium citrate, light metals which evolve hydrogen upon reaction with water, chlorinated hydrocarbons, chlorofluorocarbons, azodicarbonamide, N,N'dinitrosopentamethylenetetramine, trichloromonofluoromethane, trichlorotrifluoroethane, methylene chloride, organic carboxylic acids, pentane, butane, ethanol, acetone, nitrogen gas (N2), and ammonia gas.

* * * * *